(12) United States Patent
Trott

(10) Patent No.: US 11,738,781 B2
(45) Date of Patent: Aug. 29, 2023

(54) GRAVITATIONAL POTENTIAL ENERGY STORAGE SYSTEMS AND METHODS

(71) Applicant: Advanced Rail Energy Storage, LLC, Westlake Village, CA (US)

(72) Inventor: Howard Trott, Kirkland, WA (US)

(73) Assignee: Advanced Rail Energy Storage, LLC, Westlake Village, CA (US)

( * ) Notice: Subject to any disclaimer, the term of this patent is extended or adjusted under 35 U.S.C. 154(b) by 0 days.

(21) Appl. No.: 17/316,449

(22) Filed: May 10, 2021

(65) Prior Publication Data

US 2021/0347388 A1 Nov. 11, 2021

Related U.S. Application Data

(60) Provisional application No. 63/022,385, filed on May 8, 2020.

(51) Int. Cl.
*B61B 1/00* (2006.01)
*F03G 3/02* (2006.01)
(Continued)

(52) U.S. Cl.
CPC ................ *B61B 1/00* (2013.01); *F03G 3/02* (2013.01); *F03G 3/094* (2021.08);
(Continued)

(58) Field of Classification Search
CPC ... B61B 1/00; F03G 3/02; F03G 3/094; F03G 7/10; F03G 7/104; F03G 7/135; F03G 7/00; F03G 3/00; F05B 2260/422; H02J 15/007; H02J 3/28; Y02E 60/16; Y02E 70/30; F03D 9/16; H02K 7/025; B61C 17/06; B60L 8/00; H02N 11/00; H02N 11/008;
(Continued)

(56) References Cited

U.S. PATENT DOCUMENTS 389,713 A * 9/1888 Mullins ..................... F03G 3/00
8,166,760 B2 5/2012 Fiske
(Continued)

FOREIGN PATENT DOCUMENTS

CN 1877118 A * 12/2006 ............... F03G 7/08
DE 100 37 678 A1 2/2002
(Continued)

OTHER PUBLICATIONS

International Search Report and Written Opinion, dated Aug. 19, 2021, for International Patent Application No. PCT/US2021/031638, 13 pages.
(Continued)

*Primary Examiner* — Mickey H France
(74) *Attorney, Agent, or Firm* — Klarquist Sparkman, LLP

(57) ABSTRACT

A gravitational energy storage system is provided that includes one or more tracks extending from a lower storage yard to an upper storage yard, a plurality of mass cars moveable along the track, a conveyance system comprising at least a first tether, and a first power module associated with the first tether to drive a respective one of the first tethers to move the plurality of mass cars from the lower storage yard to the upper storage yard, and to dispatch energy when the plurality of mass cars are moved from the upper storage yard to the lower storage yard.

22 Claims, 25 Drawing Sheets

(51) Int. Cl.
*F03G 3/00* (2006.01)
*H02J 15/00* (2006.01)

(52) U.S. Cl.
CPC ....... *F05B 2260/422* (2020.08); *H02J 15/007* (2020.01); *Y02E 60/16* (2013.01)

(58) Field of Classification Search
CPC . B60M 3/00; B60M 3/06; B60M 7/00; B60M 7/003
See application file for complete search history.

(56) References Cited

U.S. PATENT DOCUMENTS

| | | | |
|---|---|---|---|
| 8,674,527 | B2 | 3/2014 | Fyke et al. |
| 8,742,616 | B1 | 6/2014 | Dehlsen et al. |
| 9,903,391 | B2 | 2/2018 | Heindl |
| 10,233,897 | B2 | 3/2019 | Stenzel |
| 2017/0288457 | A1* | 10/2017 | Peitzke ................... B61B 9/00 |
| 2018/0106235 | A1 | 4/2018 | Stenzel |
| 2019/0085689 | A1 | 3/2019 | Stenzel |
| 2020/0024108 | A1 | 1/2020 | Pedretti et al. |
| 2020/0025181 | A1 | 1/2020 | Pedretti et al. |
| 2020/0025182 | A1 | 1/2020 | Pedretti et al. |
| 2020/0028379 | A1 | 1/2020 | Pedretti et al. |

FOREIGN PATENT DOCUMENTS

| | | | |
|---|---|---|---|
| WO | WO-2012023324 A1 * | 2/2012 | ............... B61B 1/00 |
| WO | WO 2013/005056 A1 | 1/2013 | |
| WO | WO 2013/050343 A2 | 4/2013 | |
| WO | WO 2014/037352 A2 | 3/2014 | |
| WO | WO 2017/151512 A1 | 9/2017 | |
| WO | WO 2018/106235 A1 | 6/2018 | |
| WO | WO 2018/134620 A2 | 7/2018 | |
| WO | WO 2020/018329 A2 | 1/2020 | |

OTHER PUBLICATIONS

Hunt et al., "Mountain Gravity Energy Storage: a new solution for closing the gap between existing short-and long-term storage technologies," *Energy* 190: 116419, Jan. 2020.

"Gravity storage system using earth materials (EarthPumpStore)," the University of Nottingham and the World Society of Sustainable Energy Technologies, accessed at https://www.wsset.org/docs/articles/deep-storage.pdf on May 10, 2021.

* cited by examiner

GRAVITATIONAL POTENTIAL ENERGY STORAGE SYSTEMS AND METHODS

CROSS REFERENCE TO RELATED APPLICATION

This application claims the benefit of U.S. Provisional Application No. 63/022,385, filed May 8, 2020. The prior application is incorporated herein by reference in its entirety.

FIELD

This disclosure relates generally to systems and methods for energy storage, and, in particular, to gravitational potential energy storage systems.

BACKGROUND

Various systems have been implemented for storing gravitational potential energy and dispatching that energy upon demand to transmission, distribution, and other electrical grids. Such systems include, for example, pumped hydro in which water is pumped through pipes from a lower elevation to a higher elevation and flowed through pipes and turbines from a higher elevation to a lower elevation. These systems can provide a number of services for such electric grids that help grid operators maintain a reliable and cost-effective electricity system, including by facilitating and supporting the continuous balancing of electricity so that supply can continually match demand.

However, pumped hydro suffers from various deficiencies that could be improved by gravitational potential energy storage systems utilizing rails and/or tracks, such as permitting time, cost of construction, permanent land impact, water use, and recycling and reuse.

SUMMARY

Disclosed herein are various embodiments directed to energy storage solutions for grid-scale energy storage.

In one embodiment, an energy storage system is provided that includes a track extending from a lower storage yard to an upper storage yard, a plurality of mass cars moveable along the track, a conveyance system comprising a first tether and a first power module associated with the first tether to drive the first tether to move the plurality of mass cars from the lower storage yard to the upper storage yard, and to dispatch energy when the plurality of mass cars are moved from the upper storage yard to the lower storage yard.

Additional features and implementations of the disclosed energy storage solutions and methods thereof are provided herein. The foregoing and other objects, features, and advantages of the invention will become more apparent from the following detailed description, which proceeds with reference to the accompanying figures.

DETAILED DESCRIPTION

Figure 1:
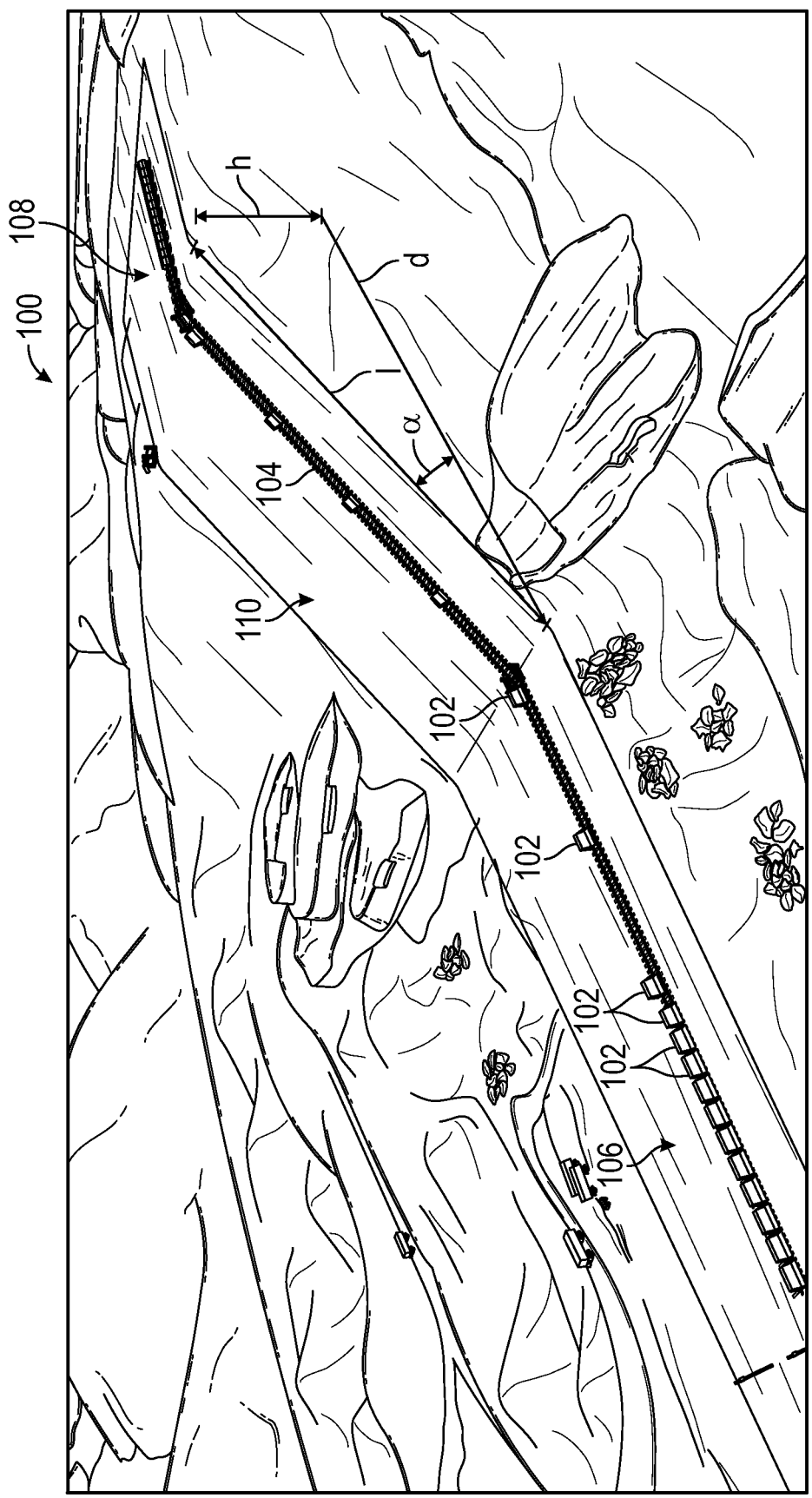
FIG. 1 illustrates an exemplary energy storage system with a track that extends from a lower storage yard to an upper storage yard.

The detailed description herein describes various electric power energy storage systems. More particularly, this disclosure relates to a gravitational potential energy storage system that employs a plurality of motor-generators with a conveyance system that is configured to transport mass cars between a lower storage area (i.e., the discharged area) and an upper storage yard (i.e., the charged area). Potential energy is stored by employing electrical grid power to transport the masses from the lower to upper storage facility using motor powered sprockets in combination with a tether driven by the sprockets. Potential energy is recovered and dispatched to the electrical grid by generator operation of the motor-generators during transport of the masses from the upper to lower storage yards. The energy storage systems disclosed herein advantageously allow for the full range of energy services including, for example, load shifting, peak shaving, and energy arbitrage, as well the full range of power services including, for example, frequency regulation, voltage regulation, load following, reactive power, contingency reserves, and black start.

The present disclosure relates to energy storage systems and methods of using the same. It should be understood that although the various embodiments described herein disclose particular methods or materials applied in specific implementations, in view of these teachings' other methods, materials, and implementations that are similar or equivalent to those described herein may be possible. As such, the following description is exemplary in nature and is not intended to limit the scope, applicability, or configuration of the disclosure in any way. Various changes to the described embodiments may be made, such as in the function and arrangement of the elements described herein, without departing from the scope of the disclosure.

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. In addition, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the terms "first", "second", and "third" may be used interchangeably to distinguish one component from another and are not intended to signify location or importance of the individual components.

The terms "upgrade" and "downgrade" refer to the relative direction with respect to the inclined areas and related height changes described herein. For example, an "upgrade" side of an element on an inclined area refers to a side of structure or component that is at or facing a higher elevation area as compared to a "downgrade" side which is at or facing a lower elevation area.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the term "electrical grid" or "power grid" refers to an interconnected network for delivering electricity from producers to consumers. Among other things, the electrical grid can include generating stations that produce power, electrical substations for stepping electrical voltage up for transmission, or down for distribution, and transmission and distribution lines that carry power and/or connect consumers to the electrical substations.

As used herein, the term "mass car" refers to any moveable mass structure on wheels and/or other rolling elements that can be transported from one location to another location having a different potential energy.

As used herein, the term "track" refers to any defined travel pathway for a mass car. A track can, for example, comprises one or more rails, or in some embodiments two or more rails, that extend along a ground surface to restrict movement of one or more mass cars away from, or out of, the defined travel pathway.

As used herein, the term "tether" refers to any length of material that can be used in a conveyance system as disclosed herein, including, for example, chains, cables, ropes, and other similar flexible members that provide a length of material, with or without linkages connecting portions thereof.

As noted above, the systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and sub combinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

FIG. 1 illustrates an exemplary energy storage system 100 comprising a plurality of mass cars 102 that are configured to move along at least one track 104 to and from a lower storage yard 106 (e.g., a discharged area) and an upper storage yard 108 (e.g., a charged area). The lower storage yard 106 and upper storage yard 108 are separated by an inclined area 110 (e.g., a slope).

As shown in FIG. 1, the inclined area 110 has a slope length l, a run d, a height h, and an angle of inclination a. A wide range of energy storage needs can be met by scaling the energy storage system and adjusting, for example, the number of tracks, the number and size of mass cars, and/or the change in height between the lower storage yard and the upper storage yard. In some embodiments, for example, the inclined area can have a grade (h/d*100) that ranges from 35% to 215%, 1% to 34%, or in other embodiments from 216% to 200,000%. The change in height between the lower storage yard and the upper storage yard can be in some embodiments, between 200 and 1,000 feet, or in others less than 200 feet or more than 1,000 feet.

Figure 2:
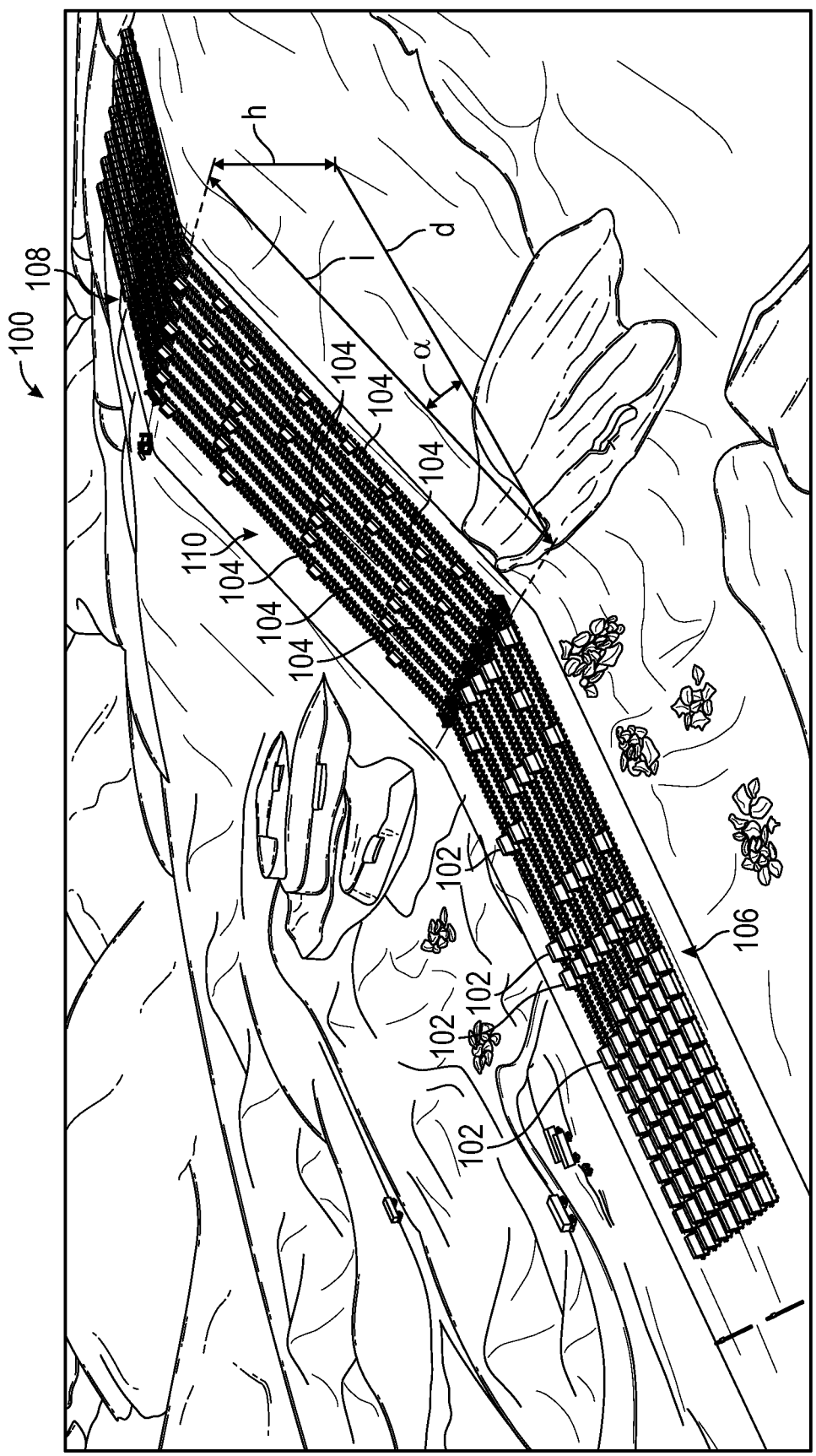
FIG. 2 illustrates an exemplary energy storage system with a plurality of tracks that extends from a lower storage yard to an upper storage yard.
Figure 3:
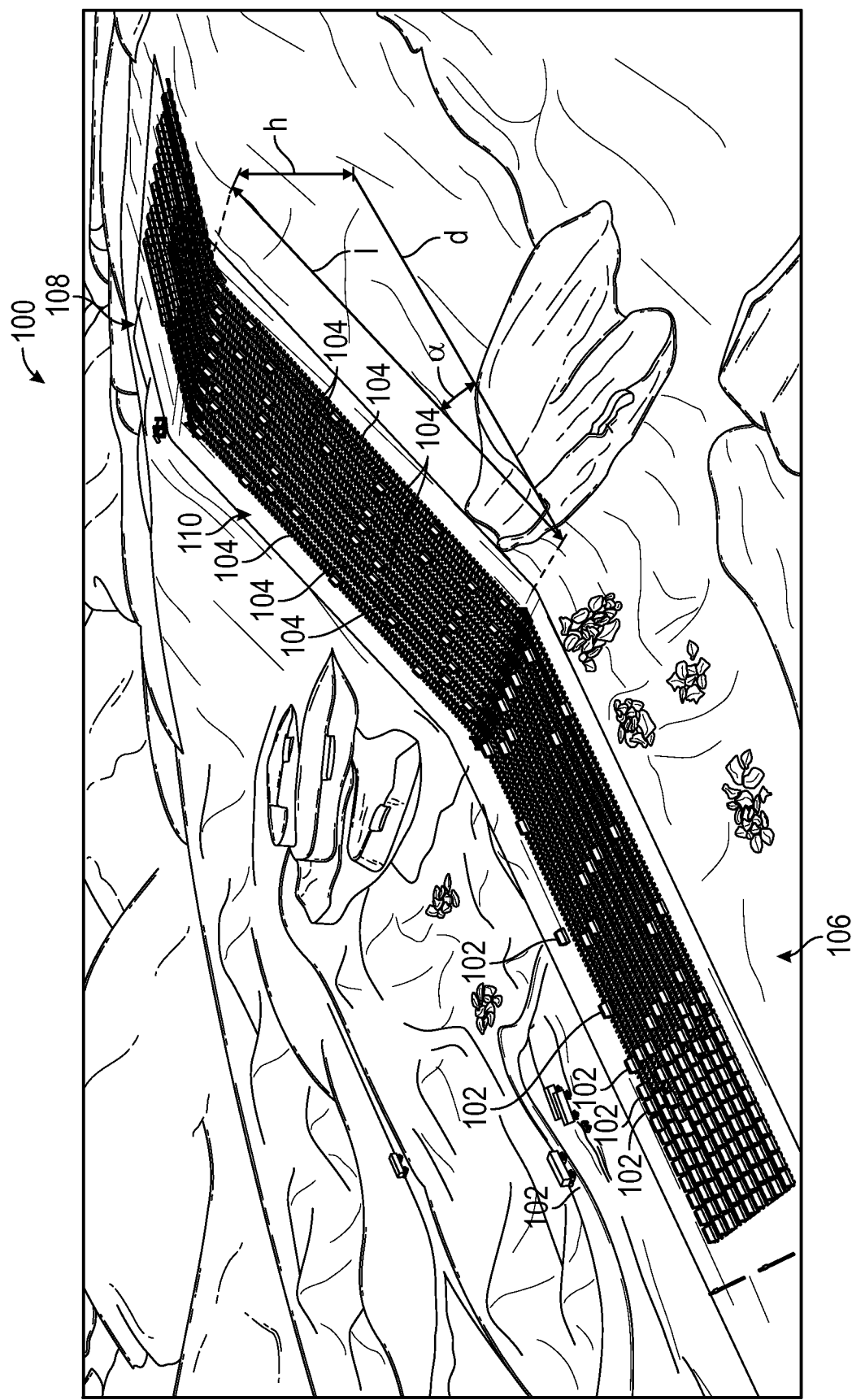
FIG. 3 illustrates another exemplary energy storage system with a plurality of tracks that extends from a lower storage yard to an upper storage yard.
Figure 4:
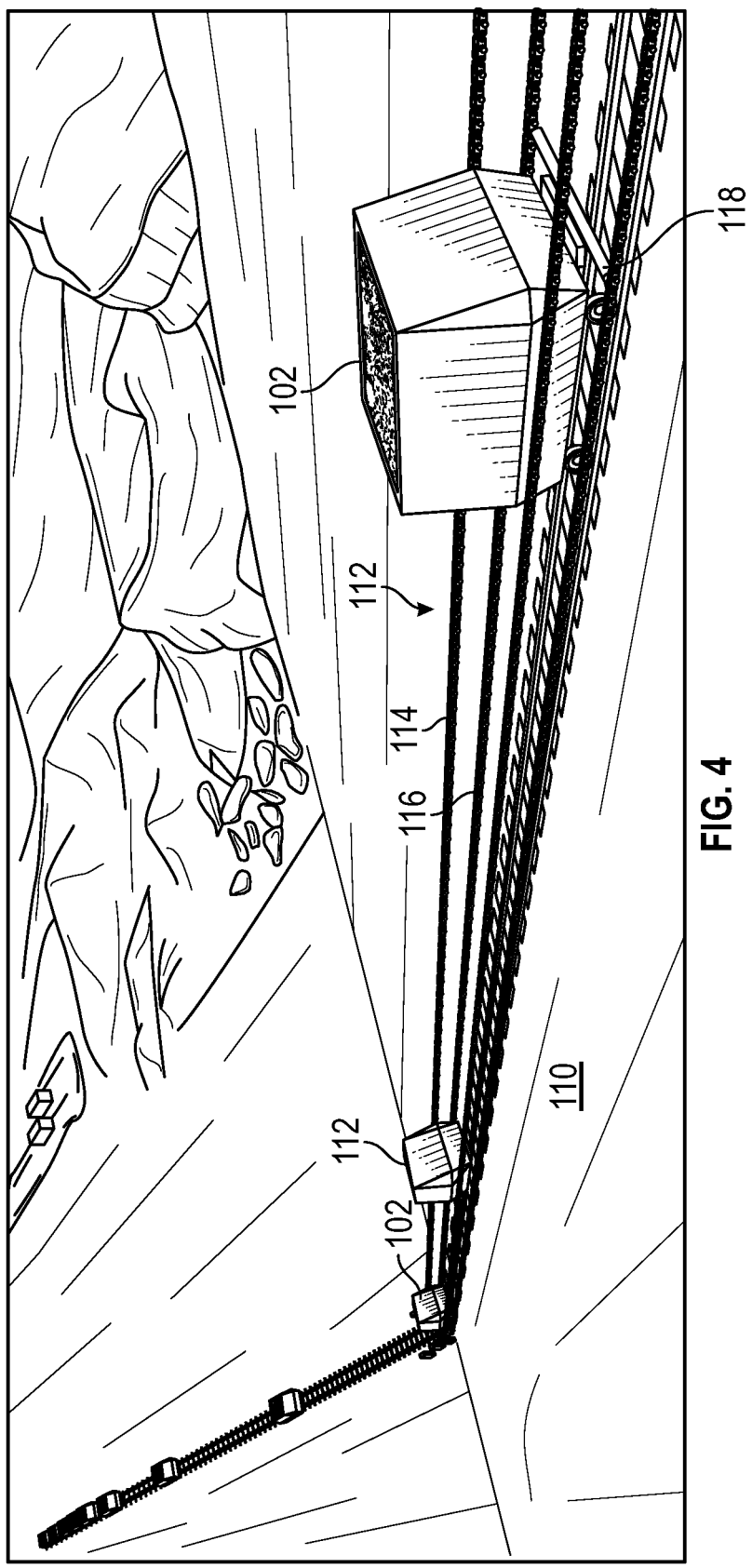
FIG. 4 illustrates an inclined section of an exemplary energy storage system that utilizes a conveyance system.

FIG. 1 illustrates a track system that consists of a single track 104. However, as shown in FIGS. 2 and 3, the number of tracks 104 can vary. In this manner, the energy storage system 100 is readily scalable, depending on the site size. FIG. 2, for example, illustrates an energy storage system 100 with seven tracks 104, and FIG. 3, for example, illustrates an energy storage system 100 with nine tracks 104. The number of tracks 104 provided can be selected based on a desired maximum power demand that the energy storage system is designed to meet. In some embodiments, the number of tracks can be greater than 1, greater than 5, or greater than 7. Although there is no technical maximum limitation for the number of tracks, in some embodiments, the number of tracks can be less than 20.

In this embodiment, each track comprises two rails which support and direct mass cars along the predefined travel pathway; however, as discussed in other embodiments, other tracks are possible, such as rail systems that restrict lateral movement outside of the predetermined travel pathway by providing an enclosed pathway.

As shown in FIGS. 4-9, mass cars 102 are transported up and down the inclined area via one or more conveyance systems 112. Each conveyance system can comprise a first tether 114 on a first side of a respective track 104, and a second tether 116 on a second side of the respective track 104. The tethers can be chains, formed, for example, from aluminum and/or steel. In some embodiments, the tethers can comprise endless loop structures (e.g., closed loops of material). However, it should be understood that the tether need not be an endless loop. For example, instead of a loop, the tether could be a length of material that simply moves back and forth along the length of the track to convey the mass cars up the slope.

Preferably, the slope has a generally continuous grade along the entirety of the conveyance system so that the transport of mass cars can be maintained at a set grid-synchronization speed; however, if the grade is not continuous along the conveyance system, power generation and/or braking of the motor-generators discussed herein can be adjusted to accommodate differences in grade along the length of the conveyance system.

Figure 10:
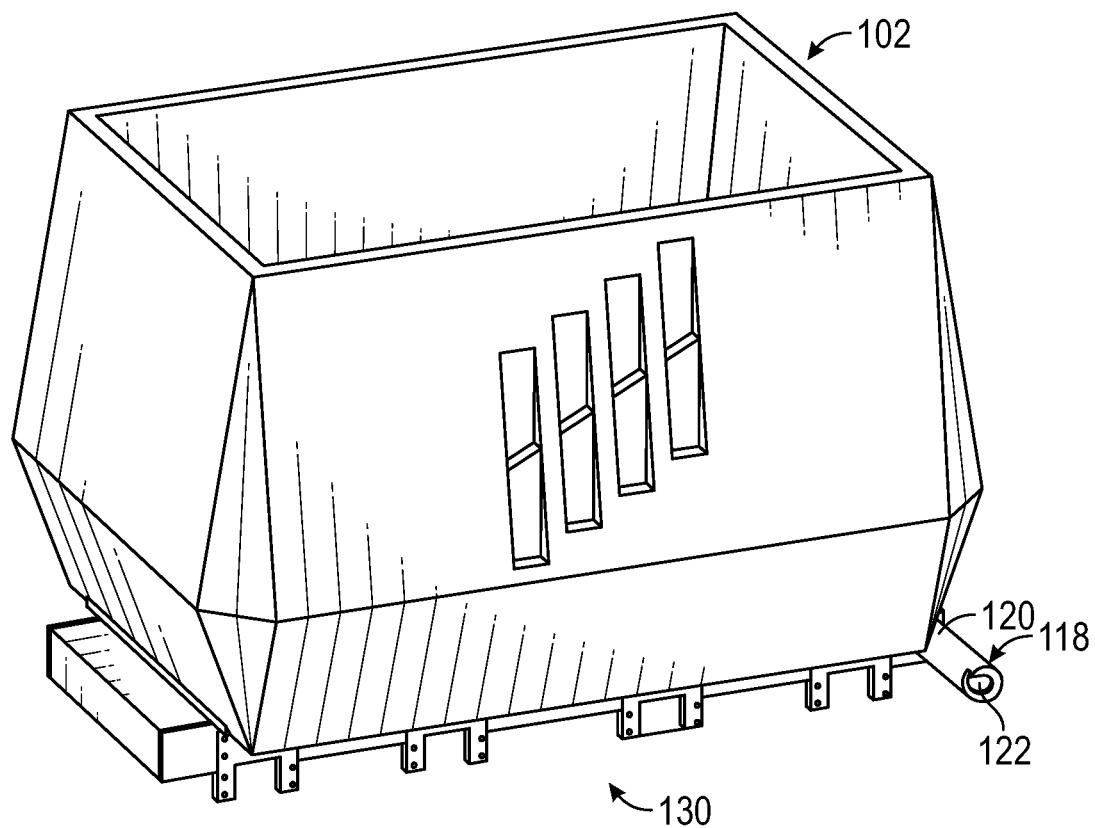
FIG. 10 illustrates an exemplary mass car for use with an energy storage system.
Figure 11:
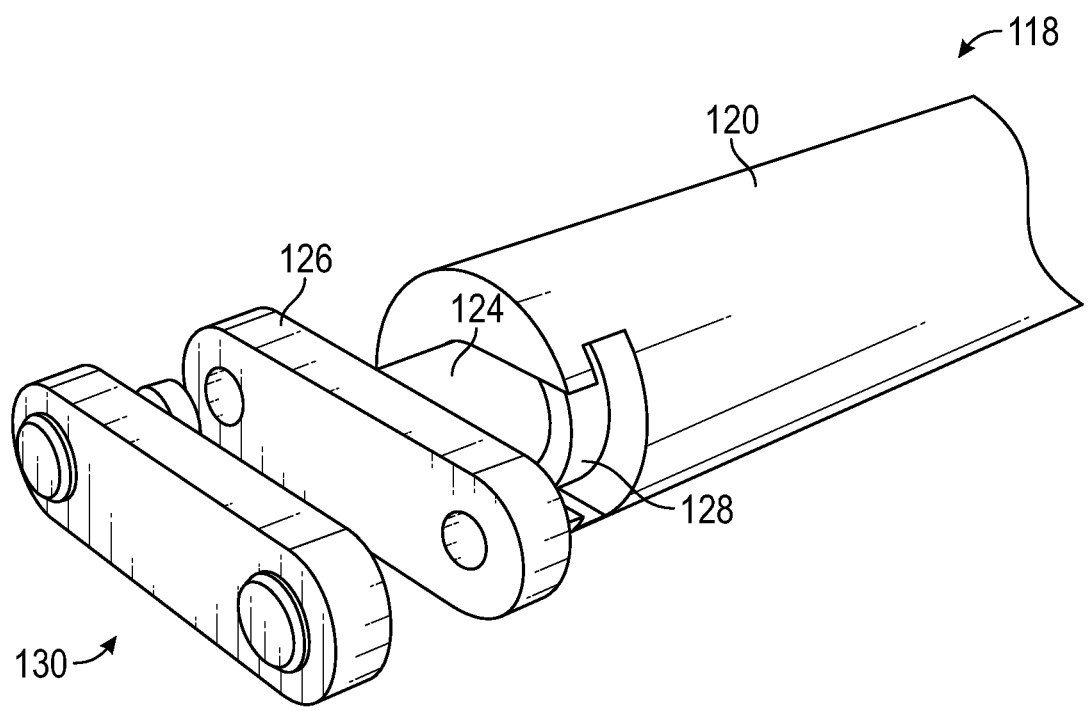
FIG. 11 illustrates an exemplary coupling member for a mass car and conveyance system of an energy storage system.

Each mass car 102 can have one or more coupling members 118 (e.g., a bar, frame, pin, or other rigid structure) that extend from the mass car 102 to engage with a corresponding coupling fixture on the first and second tethers 114, 116. FIG. 10 illustrates a mass car 102 with a coupling member 118 and FIG. 11 illustrates a coupling member in supporting engagement with a corresponding fixture (i.e. Although the coupling member 118 is shown on one end of the mass car 102 (i.e., an "upgrade" end), it should be understood that it can be positioned at other locations, if desired, such as along the side of the mass car or at the "downgrade" side. In addition, if desired, a plurality of coupling members 118 can be provided on each car, such as one at the "upgrade" end and one at the "downgrade" end.

As shown in FIGS. 10 and 11, in one embodiment coupling members 118 can comprise an extension portion 120 and a receiving portion 122 that includes an opening facing a "downgrade" direction 130 to provide a partially-enclosed pocket. The corresponding fixture of a respective tether 114, 116 can comprise a shaft 124 that extends from one or more tether links 126 to engage with the receiving portion 122 of a respective coupling member 118. In some embodiments, the shaft 124 of the corresponding fixture on the tether can comprise an enlarged portion 128 (e.g., an enlarged head portion) that restricts lateral movement of the shaft relative to the coupling member 118 when received therein.

A similar coupling member/corresponding fixture can be provided on the other end of the mass car so that the mass car 102 can simultaneously engage with both the first tether 114 and the second tether 116.

As noted above, the receiving portion 122 of the coupling members 118 can be positioned with the opening facing a "downgrade" direction 130. In this manner, the coupling members 118 of the mass cars 102 are in continuous engagement with the corresponding fixture of the tether(s) 114, 116, whether the mass car is being pulled up the inclined area by the tethers when charging or pulling the tethers down the inclined area when discharging.

Other coupling members and corresponding fixtures on the tether are contemplated. For example, in another embodiment, one or more sawtooth structures can be provided on the tethers 114, 116, which are configured to engage and release a coupling member, such as a bar, frame, pin, or other rigid structure, of the mass car in a similar manner to the structure shown in FIGS. 10 and 11.

Figure 5:
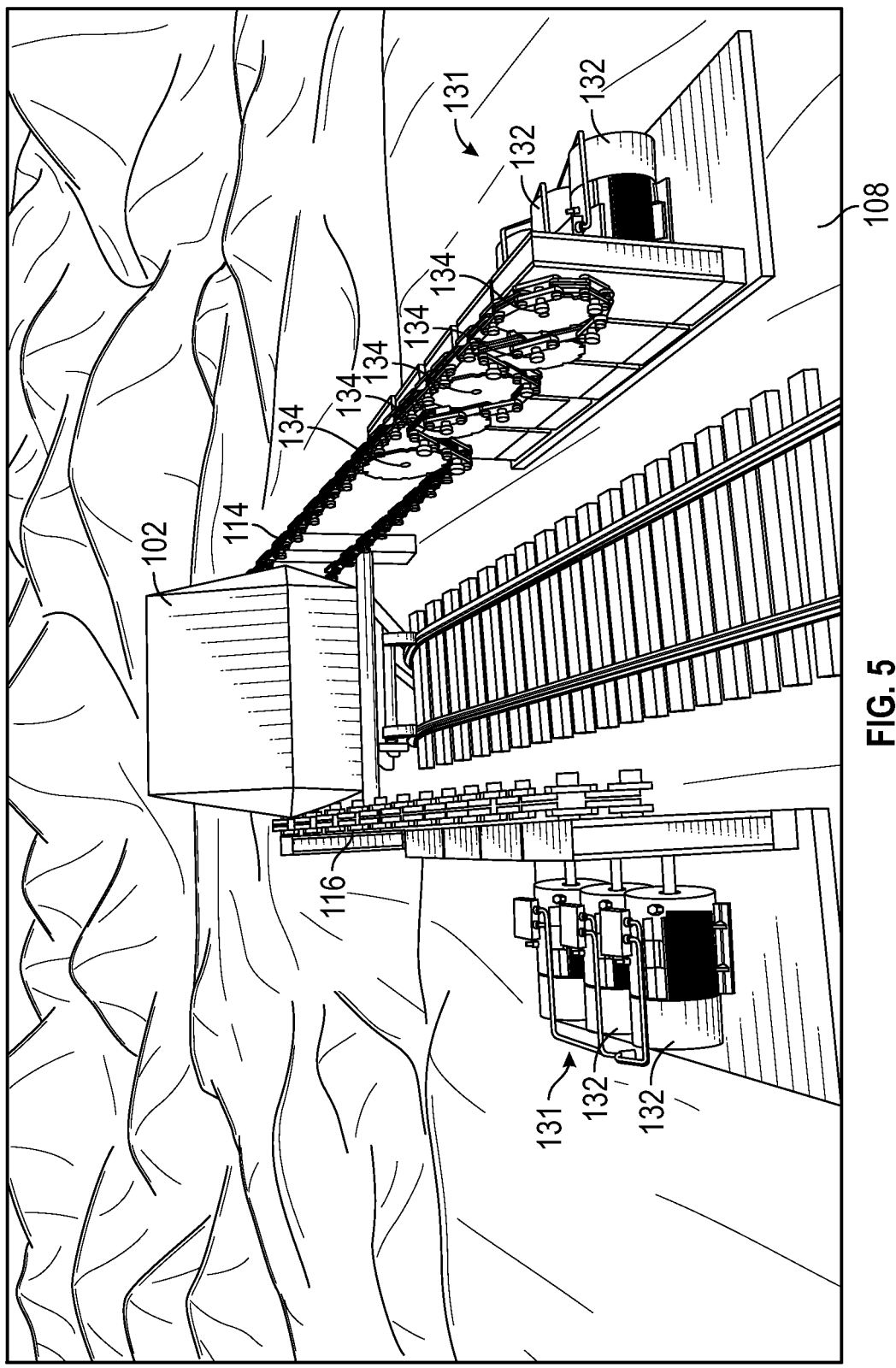
FIG. 5 illustrates an energy storage system that includes a conveyance system and a pair of power modules for moving mass cars on the conveyance system.
Figure 6:
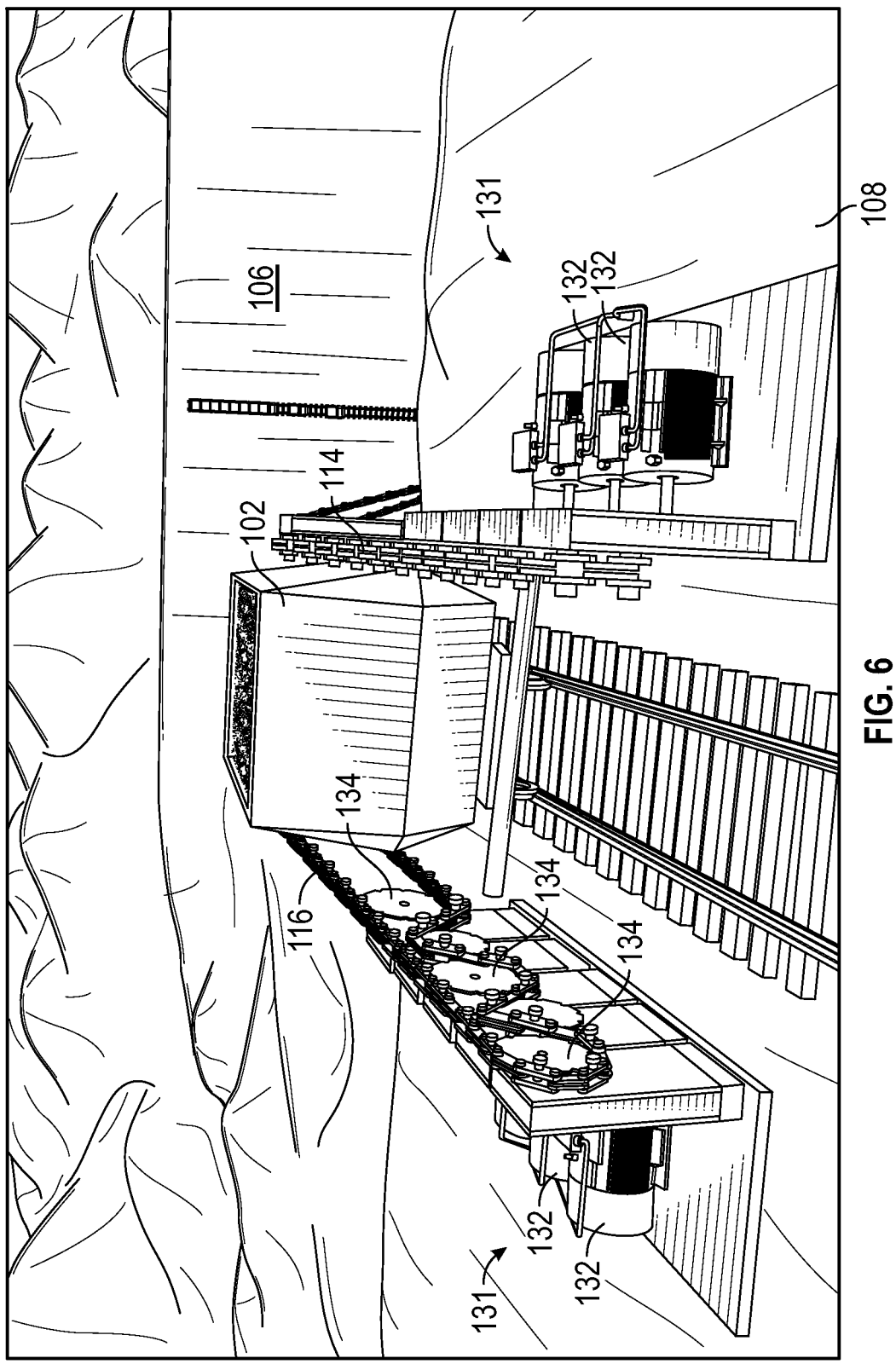
FIG. 6 illustrates another view of the energy storage system shown in FIG. 5.
Figure 12:
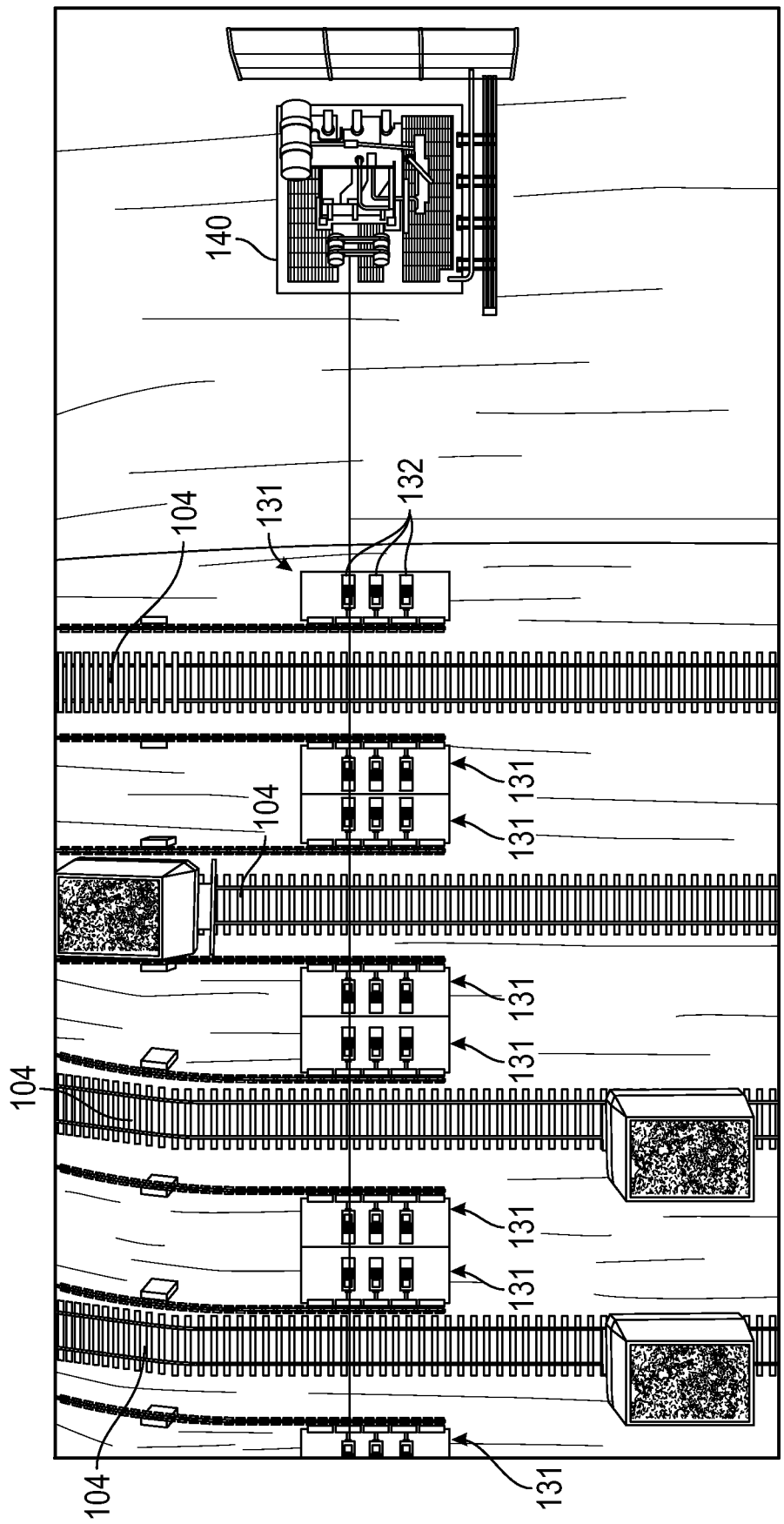
FIG. 12 illustrates an exemplary energy storage system comprising a plurality of tracks and power modules coupled to a substation.

Referring to FIGS. 5 and 6, a mass car 102 is illustrated cresting an inclined area 110 (i.e., moving from the inclined area to an upper storage yard 108. Each track can have a pair of power modules 131 (one for each tether 114, 116) that comprise a plurality of motor-generators 132 are provided to engage a respective sprocket 134 during charging and discharging. During charging, motor-generators 132 drive the respective sprockets using energy from the electrical grid to move one or more mass cars 102 up the inclined area 110 to the upper storage yard 108. During discharging, one or more mass cars 102 move down the inclined area 110 to the lower storage yard 106. The potential energy stored with the mass cars 102 at the upper storage yard 108 is converted back into electricity by regeneratively braking the movement of the mass cars 102. The motor-generators can convert the electricity into a form that suitable for the power grid and the dispatched energy can be routed by a control system to the power grid, e.g., through substation (FIG. 12).

In addition to controlling the routing of energy into the power grid, the control system of the energy storage system can control the operation of the power modules and conveyance system, including the position of each mass car, and the speed, acceleration, and direction of transport (i.e., charging, discharging) of the mass cars.

A braking system can be associated with each motor-generator. In some embodiments, as a safety measure, the braking system can comprise a compressed air system that is engaged with the braking system and a loss of air pressure on the braking system causes the brakes to engage and restrict movement of the tethers of the conveyance system when emergency braking is required.

Figure 7:
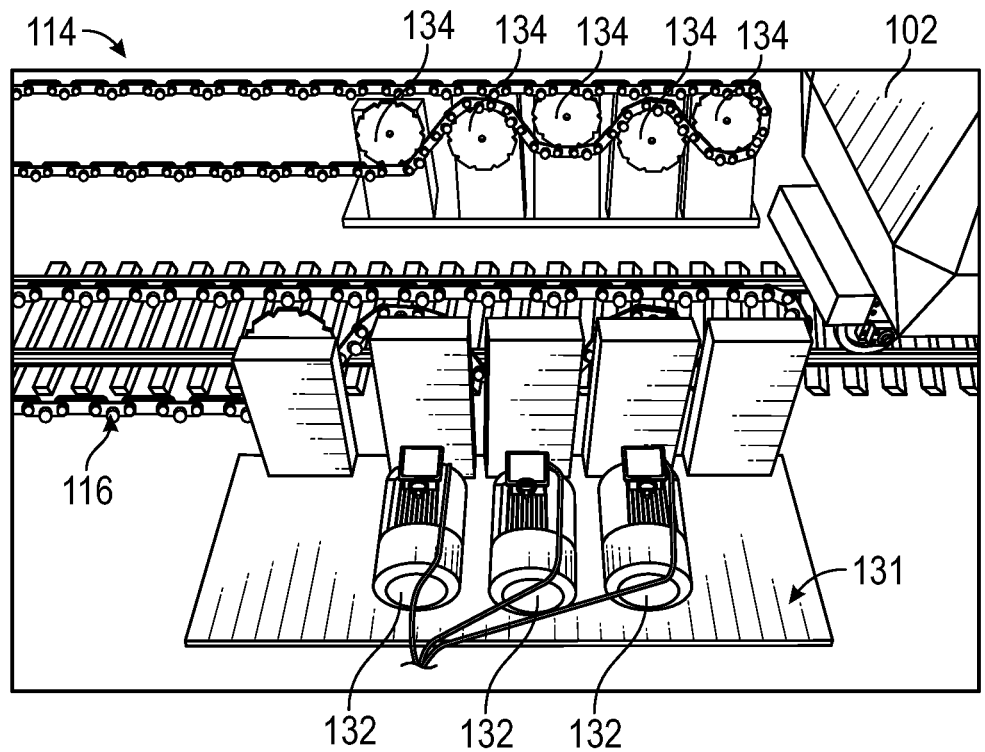
FIG. 7 illustrates another view of the energy storage system shown in FIG. 6.
Figure 8:
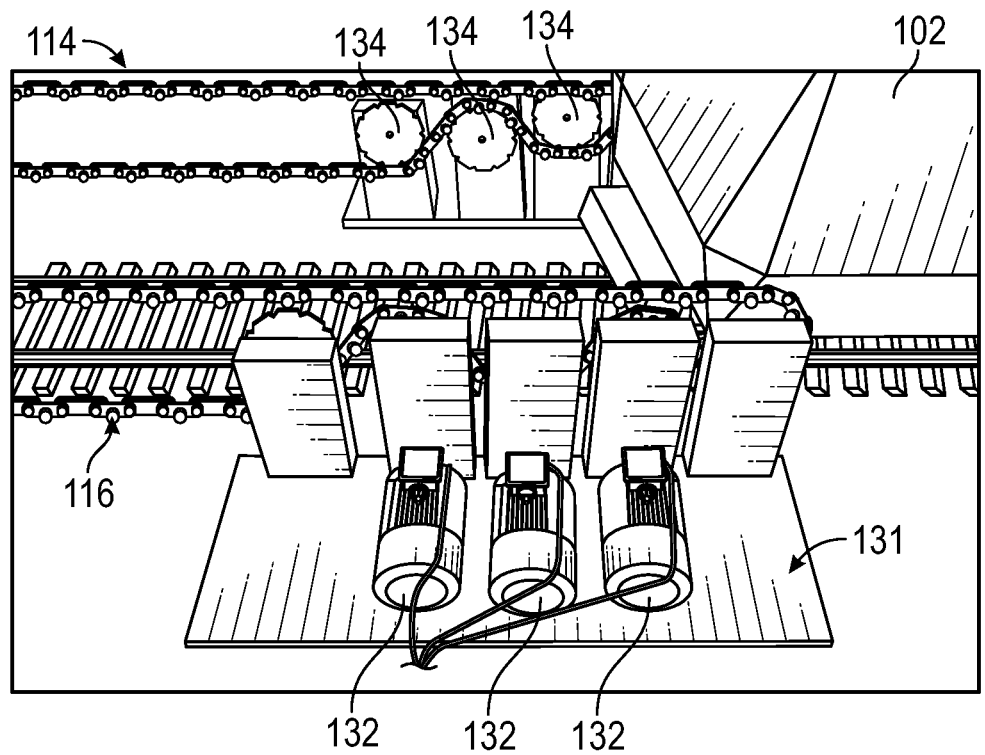
FIG. 8 illustrates another view of the energy storage system shown in FIG. 6.

Referring to FIGS. 7 and 8, each tether 114, 116 of the conveyance system 112 has an associated group of motor-generators that engage with respective sprockets. To facilitate guiding the tether, one or more of the sprockets 134 can be idler sprockets. In some embodiments a gearbox can be provided to increase the torque provided a speed and torque change to the conveyance system from an input shaft of the motor-generators.

Figure 9:
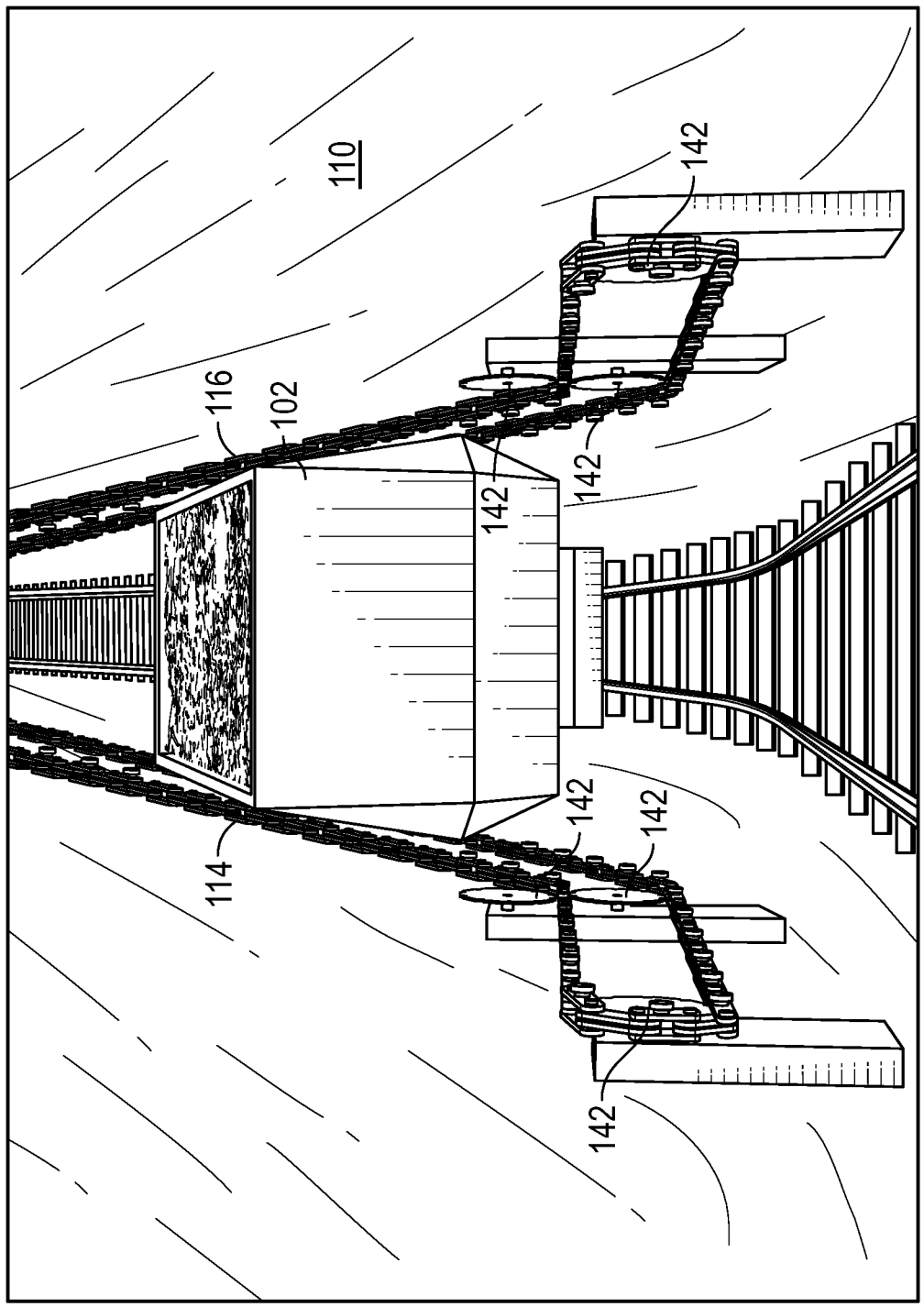
FIG. 9 illustrates an energy storage system with a mass car on a lower portion of an inclined area.

FIG. 9 shows an exemplary mass car 102 at the bottom of the inclined area, approaching the lower storage yard 106. Here, during discharge the conveyance system 112 releases respective mass cars from engagement with the tethers 114, 116. As discussed above, mass cars 102 can be engaged by a coupling system that receives a corresponding fixture on a tether at a "downgrade" face of the coupling system. The conveyance system 112 can comprise a plurality of undriven sprockets 142 (e.g., idler sprockets) at the downgrade end of the conveyance system 112. Thus, as the tethers 114, 116 reverses direction at the final sprocket 142, the respective fixtures of the tethers 114, 116 can disengage from coupling system(s) of the respective mass car 102. As such, the mass car 102 is released and can continue to move toward a desired location in the lower storage yard 106. Similarly, when the mass car 102 crests the inclined area 110 at the location of the power modules, it can be released from its coupling with tethers 114, 116 and continue toward the upper storage yard 108.

In some embodiments, at least a portion of lower storage yard 106 can have a slight downward slope that permits mass cars released from the conveyance system 112 to continue toward a desired downgrade location in the lower storage yard 106. Similarly, at least a portion of upper storage yard 108 can have a slight downward slope that permits mass cars released from the conveyance system 112 to continue toward a desired downgrade location in the upper storage yard 106 away from the location of the power modules.

Transport of mass cars within the lower and upper storage yards 106, 108 can be achieved in various manners. In some embodiments, the grade of the lower and upper storage yards 106, 108 can cause the mass cars to move by gravity, in one direction at least, to a desired location. For example, as discussed above, mass cars released after discharging can continue to move downgrade to a desired storage area of the lower storage yard 106.

In another embodiment, one or more tug units can move mass cars within the areas of the lower and upper storage yards 106, 108. For example, in one embodiment, tug units can be a low profile self-powered vehicle that can push and/or pull individual mass cars along track portions of the lower and/or upper storage yards 106, 108.

In another embodiment, transport of the mass cars can be achieved by providing a connection between adjacent mass cars along a track. For example, a cable can be provided between adjacent mass cars along a track and movement of one mass car along the incline can cause the movement of an adjacent mass car at the lower or upper storage yard. In some embodiments, the cable can have a locked-out length and can be a retracting cable that can retract into a reel when a distance be the adjacent mass cars is less than the locked-out length. In operation, for example, as a first mass car is pulled up the inclined area 110 by the conveyance system during charging, a length of the cable between the first car and an adjacent, second car in the lower storage yard 106 increases until the locked-out length is reach. At that time, the second car is pulled toward the conveyance system and, eventually, engages with the conveyance system in the same manner as the first car. In a similar manner, an adjacent mass car can be pulled into a discharging position on the conveyance system from a position at the upper storage yard 108.

FIG. 12 illustrates a schematic view of a plurality of tracks 104 carrying mass cars 102. As discussed above, a pair of power modules 131 comprising motor-generators 132 are provided on each side of a respective track 104. In some embodiments, each power module 131 can comprise between two and twenty high-efficiency motor-generators, or, in other embodiments, one high-efficiency motor-generator, or between twenty-one and fifty high-efficiency motor-generators. Power modules 131 can be coupled to a substation 140 by so that the substation 140 can deliver energy used by the power modules 131 (during charging) and receive energy dispatched by the power modules 131 (during discharging).

Figure 13:
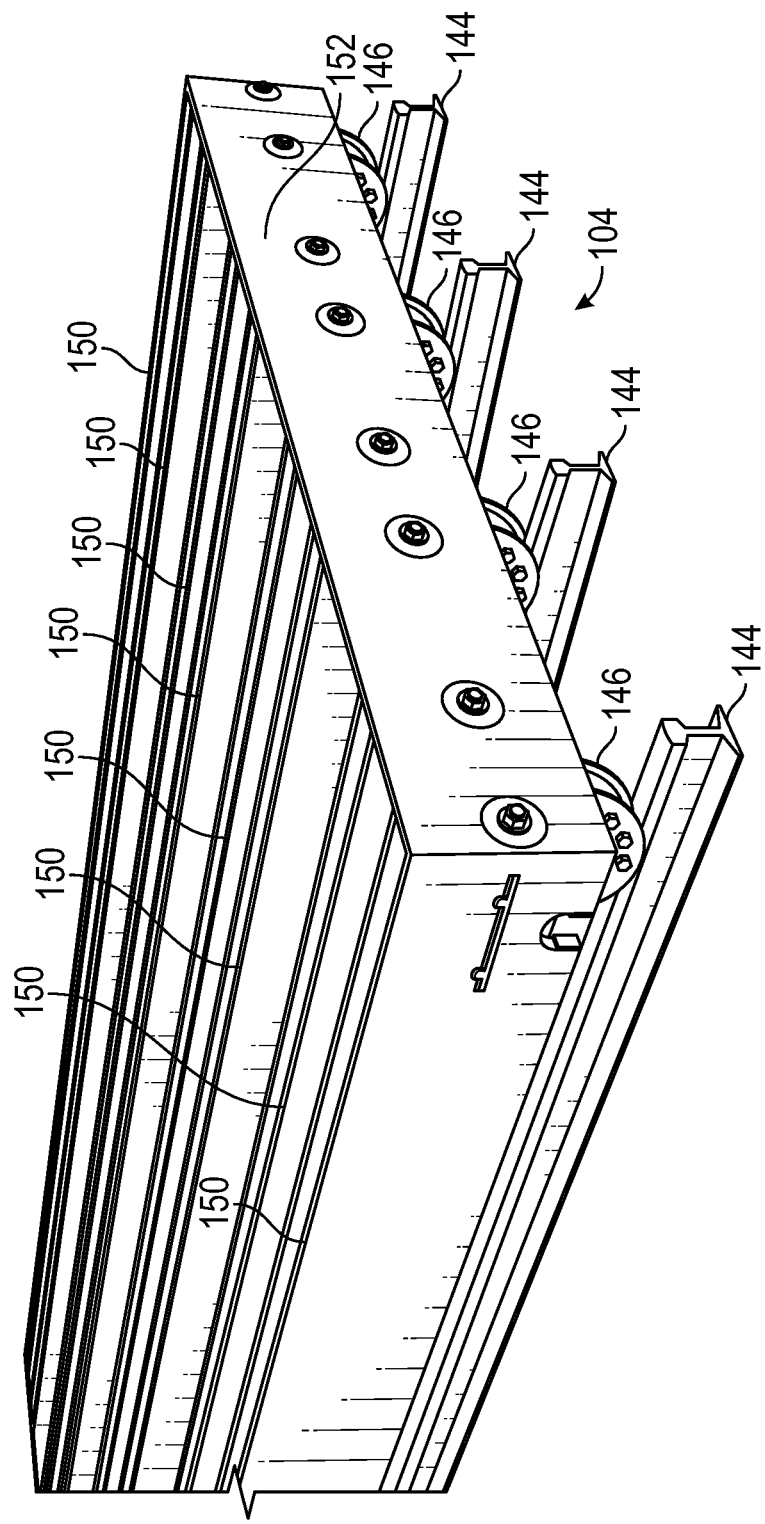
FIG. 13 illustrates an exemplary mass car for use with an energy storage system.
Figure 14:
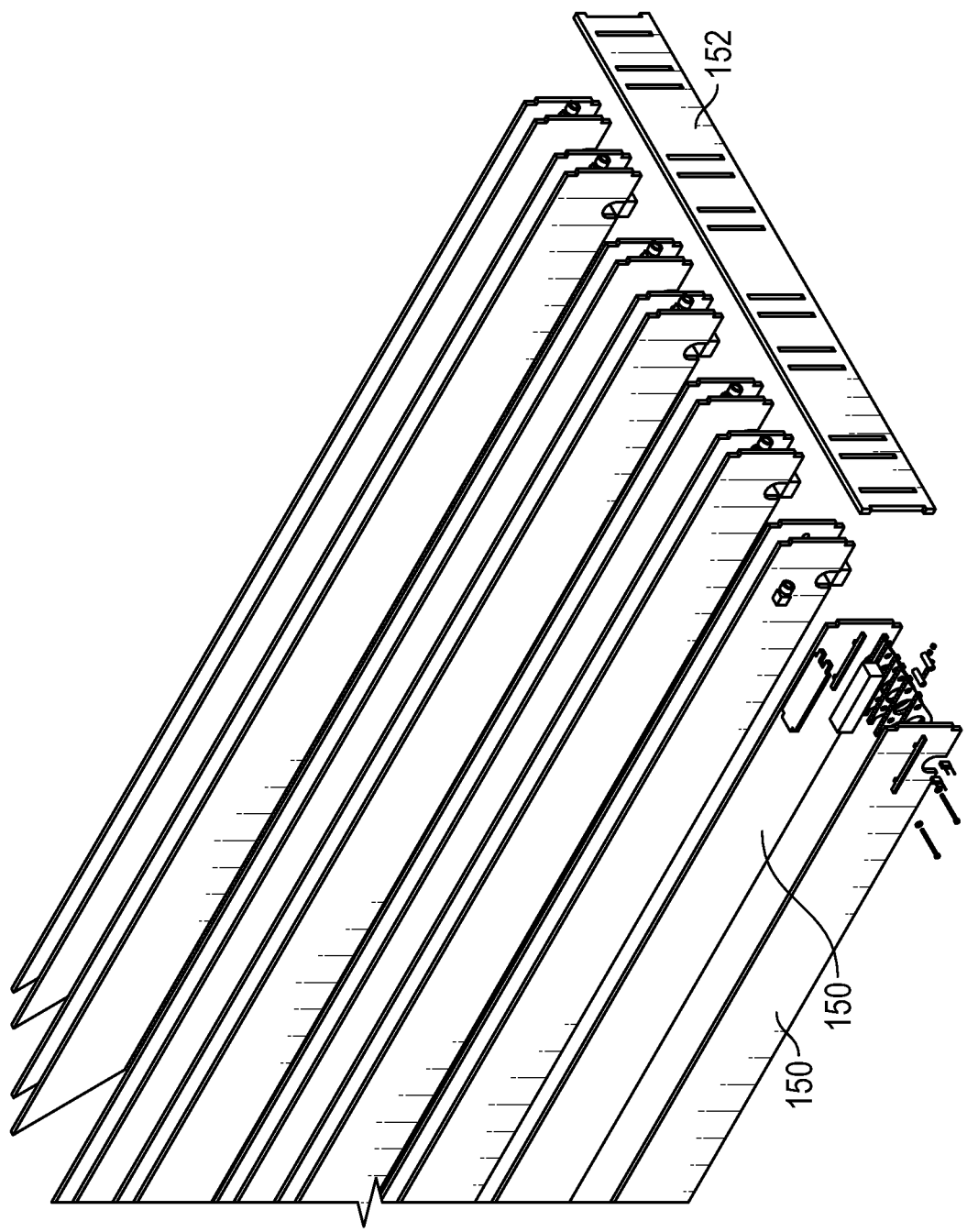
FIG. 14 illustrates an exploded view of a mass car support system.

As discussed above, tracks 104 can include two rails that support and direct the wheels of the mass cars. In other embodiments, more than two rails can be provided for each track 104. For example, as shown in FIG. 13, track 104 can include four rails 144 which support and direct respective wheels 146 of a mass car 102. In addition, FIG. 13 illustrates a mass car support frame 148 that includes a plurality of longitudinal support members 150 coupled to a pair of end support members 152. FIG. 14 is an exploded view of the mass car support frame 148 shown in FIG. 13.

Figure 15:
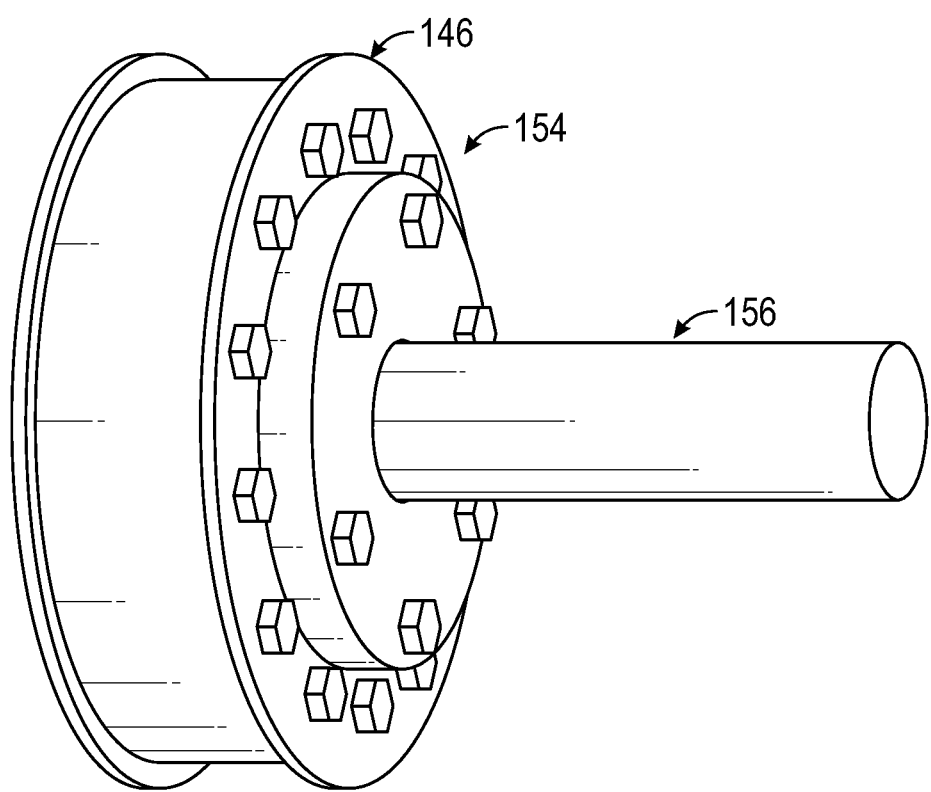
FIG. 15 illustrates a wheelset for use with a mass car in an energy storage system.
Figure 16:
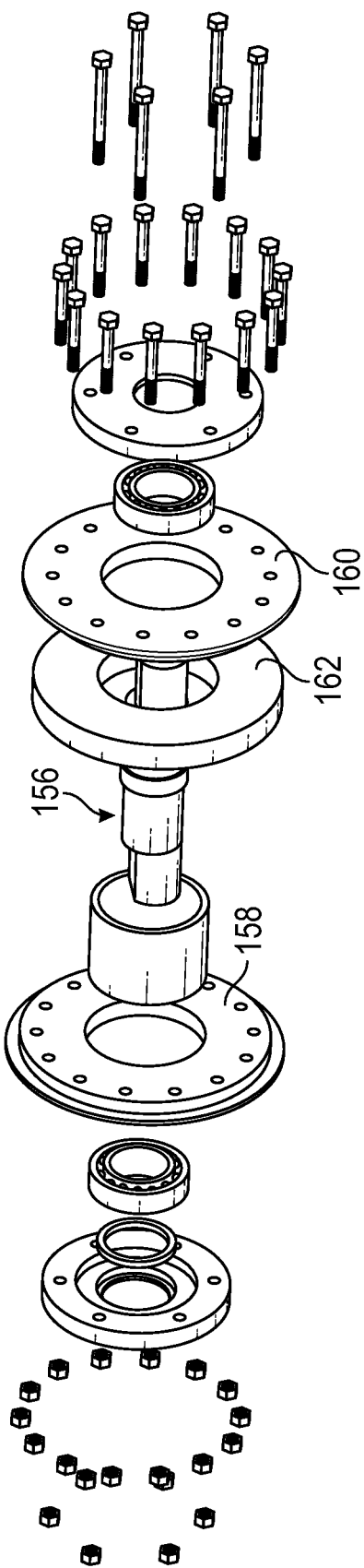
FIG. 16 illustrates an exploded view of the wheelset shown in FIG. 15.

Referring to FIGS. 15 and 16, an exemplary wheelset 154 for use with a mass car support frame, such as support frame 148 shown in FIGS. 13 and 14. Wheelset 154 can comprise a wheel 146 that is a double flanged track wheel supported on an axle 156. As shown in FIG. 16, the wheel 146 comprises a first flanged section 158, a second flanged section 160 and a central wheel portion 162 coupled between the first and second flanged sections 158, 160. Each wheel set 154 thus can have its own axle and when used with mass car support frame 148 the resulting mass car 102 can have eight wheels and eight axles.

As discussed in more detail herein, during periods where there is excess power due to an imbalance of supply and demand on the grid, energy from the grid is used to power the motor-generators 132 through substation 140 to allow the conveyance systems to pull the mass cars 102 up the inclined area 110 to the upper storage yard 108. During periods where there is a shortfall of power due to higher demand on the grid than supply, the mass cars 102 descend down the inclined area 110 on the conveyance system to the lower storage yard 106 and energy is dispatched from the motor-generators and delivered to the grid through substation 140.

In some embodiments, each track 104 of the energy store system 100 can be configured to transport a single mass car 102 in the inclined area 110 at a time (e.g., a single-mass transport system). In this manner, the external weight on the conveyance system 112 is the weight of a single mass car. In an exemplary embodiment, a mass car can weigh between 2 and 350 tons, or between 0 and 2 tons or between 351 and 500 tons. Alternatively, a plurality of mass cars 102 can be transported in the inclined area 110 of a track 104 at the same time. In this manner, the external weight on the conveyance system 112 is the combined weight of the mass cars and, as such, individual mass cars can, in some embodiments, have a reduced weight relative to the single transport system.

As discussed above, there may be a plurality of mass cars on a particular track of the slope at a time or, alternatively, the system can be configured to have a single mass car on a particular track of the slope at one time. If one mass car, or few mass cars, are on the slope at a time, it may be desirable to provide one or more supporting structures that engage with the tethers to maintain a desired shape of the tethers and avoid undesirable amounts of catenary sag. Various intermediate supporting structures can be provided either stationary or moveable along the track, such as one or more stationary idler sprockets mounted along the track and/or one or more moveable mass car support frames (e.g., without the mass) with coupling members that engage with the tethers in the same manner as the mass cars.

These systems and methods of energy storage described herein generates electric power by the transiting of mass cars through descending slope environments in a variety of suitable environments. Table A below illustrates energy storage systems on slopes ranging from 2.5° to 65° as measured from a horizontal reference plane of 0°.

TABLE A

| Grade Angle to Horizontal (degrees) | Vertical Rise Per 1 Unit of Horizontal Run | Slope (Percent) |
| --- | --- | --- |
| 2.5 | 0.0437 | 4.37% |
| 5.0 | 0.0875 | 8.75% |
| 7.5 | 0.1317 | 13.17% |
| 10.0 | 0.1763 | 17.63% |
| 12.5 | 0.2217 | 22.17% |
| 15.0 | 0.2679 | 26.79% |
| 17.5 | 0.3153 | 31.53% |
| 20.0 | 0.3640 | 36.40% |
| 22.5 | 0.4142 | 41.42% |
| 25.0 | 0.4663 | 46.63% |
| 27.5 | 0.5206 | 52.06% |
| 30.0 | 0.5774 | 57.74% |
| 32.5 | 0.6371 | 63.71% |
| 35.0 | 0.7002 | 70.02% |
| 37.5 | 0.7673 | 76.73% |
| 40.0 | 0.8391 | 83.91% |
| 42.5 | 0.9163 | 91.63% |
| 45.0 | 1.0000 | 100.00% |
| 47.5 | 1.0913 | 109.13% |
| 50.0 | 1.1918 | 119.18% |
| 52.5 | 1.3032 | 130.32% |
| 55.0 | 1.4281 | 142.81% |
| 57.5 | 1.5697 | 156.97% |
| 60.0 | 1.7321 | 173.21% |
| 62.5 | 1.9210 | 192.10% |
| 65.0 | 2.1445 | 214.45% |

Although Table A expresses particular ranges in increments of 2.5°, it should be understood that any intermediate condition may also be suitable for use.

Because of the flexibility of design and operation, the energy storage systems disclosed herein can not only store energy for use at a later time, but also provide a wide range of power services which enable the electrical grid to adjust to momentary changes in demand, regulate frequency and voltage, and provide emergency capability to restart an electric grid following a failure event.

Additional embodiments of gravitational energy storage systems using track systems that define a pathway of travel for mass cars are illustrated in FIGS. 17-23. Descriptions of the energy storage systems above also apply in the following embodiments, unless specifically referred to otherwise or unless one of ordinary skill in the art would, in view of this specification, understand that such descriptions would not and/or could not apply to specific embodiments.

Figure 17:
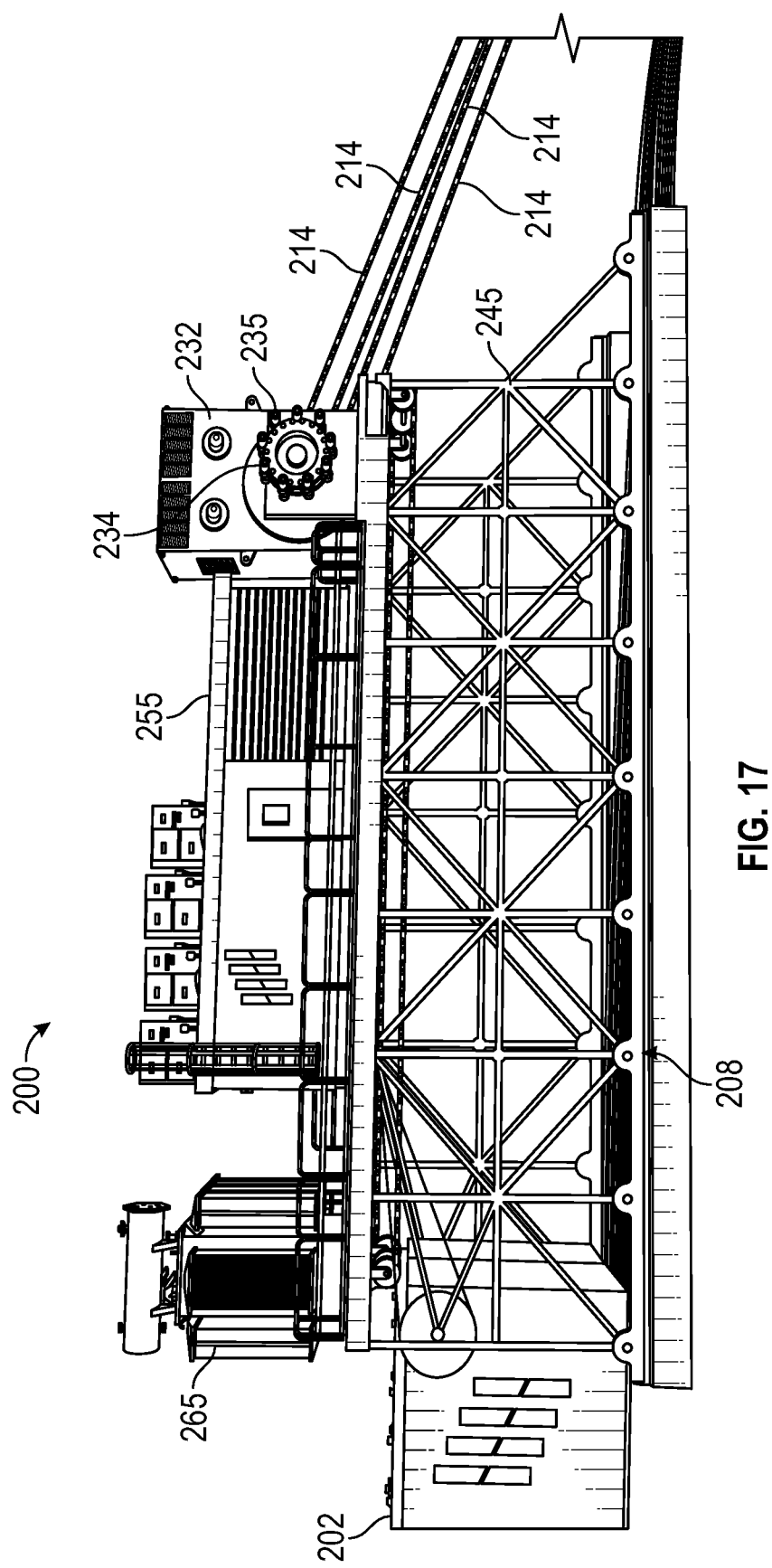
FIG. 17 illustrates an exemplary energy storage system including a raised, supporting structure at an upper storage yard.

FIG. 17 illustrates another embodiment of a gravitational energy storage system that uses a track system for moving mass cars from a first location in a lower storage yard to a second location in an upper storage yard.

As in the other embodiments, the system uses highly-efficient electric motor-generators to pull the mass cars uphill, converting electric power to mechanical potential energy. When needed, mass cars are deployed downhill delivering electric power to the grid. As in the other embodiments, these systems utilize machines with high service life such as motors and tethers (e.g., chains) to create a storage solution that requires minimal maintenance, does not require fossil fuels or water, and eliminates and/or reduces emissions and hazardous waste.

Figure 20:
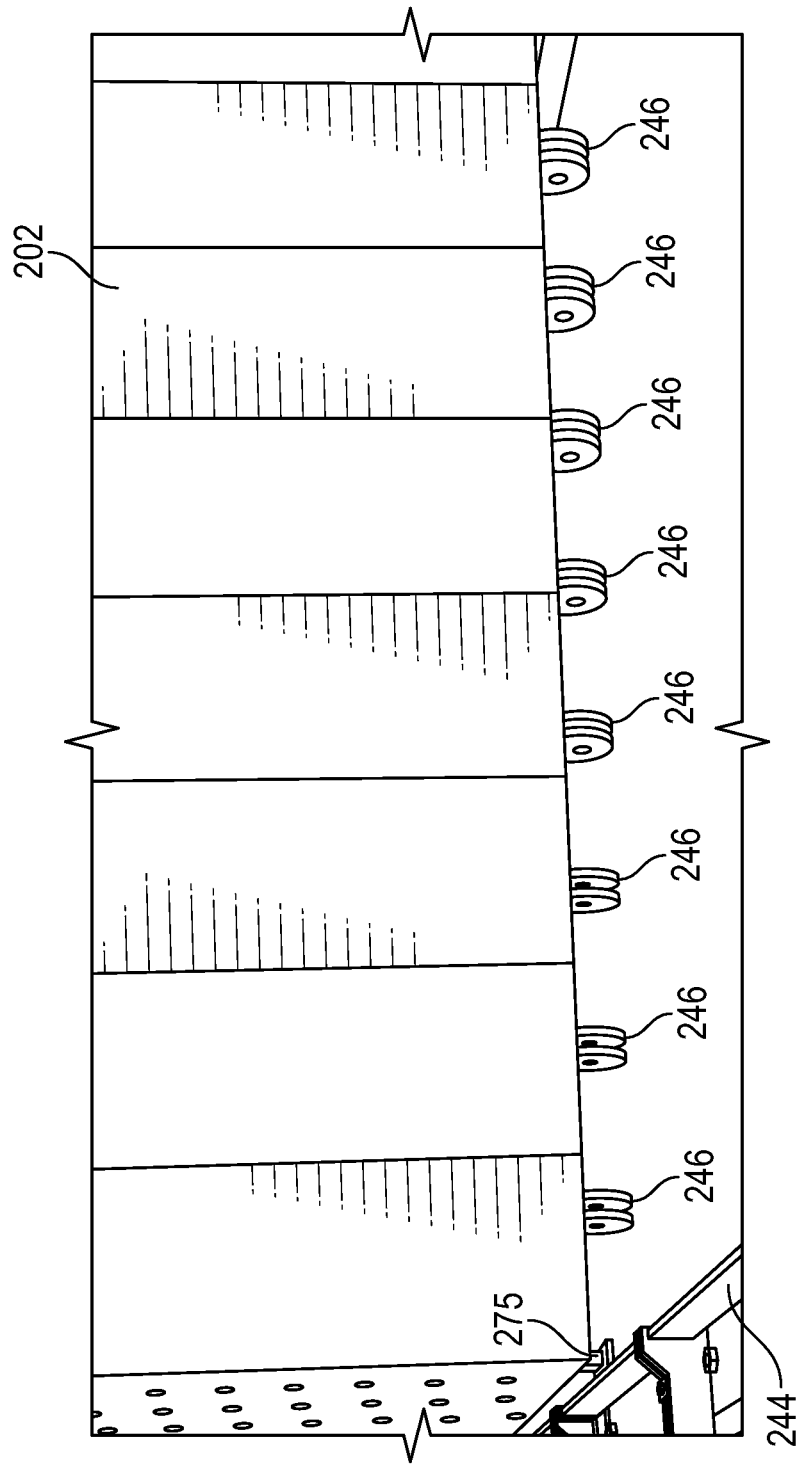
FIG. 20 illustrates another mass car of an energy storage system on a track.
Figure 21:
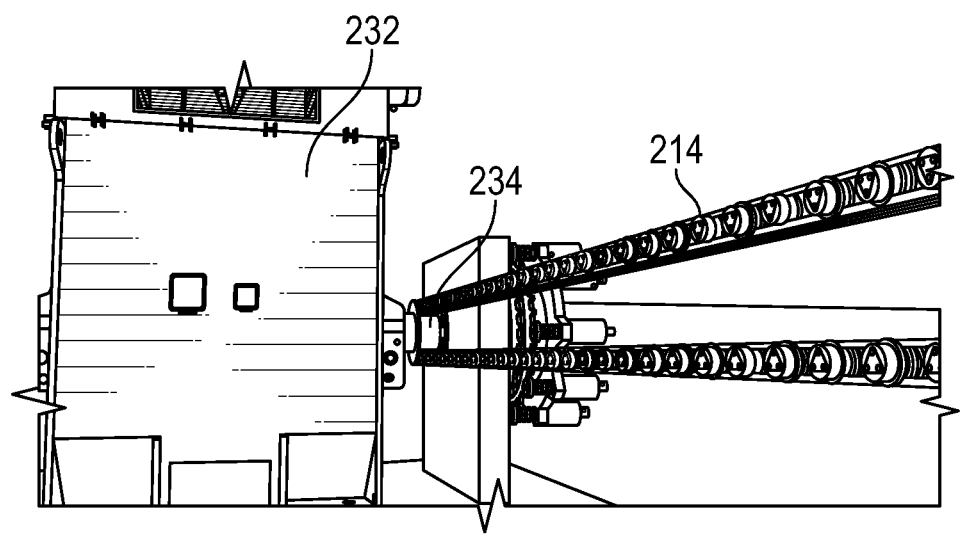
FIG. 21 illustrates a motor-generator driving a tether that is configured to be releasably coupled to one or more mass cars.
Figure 22:
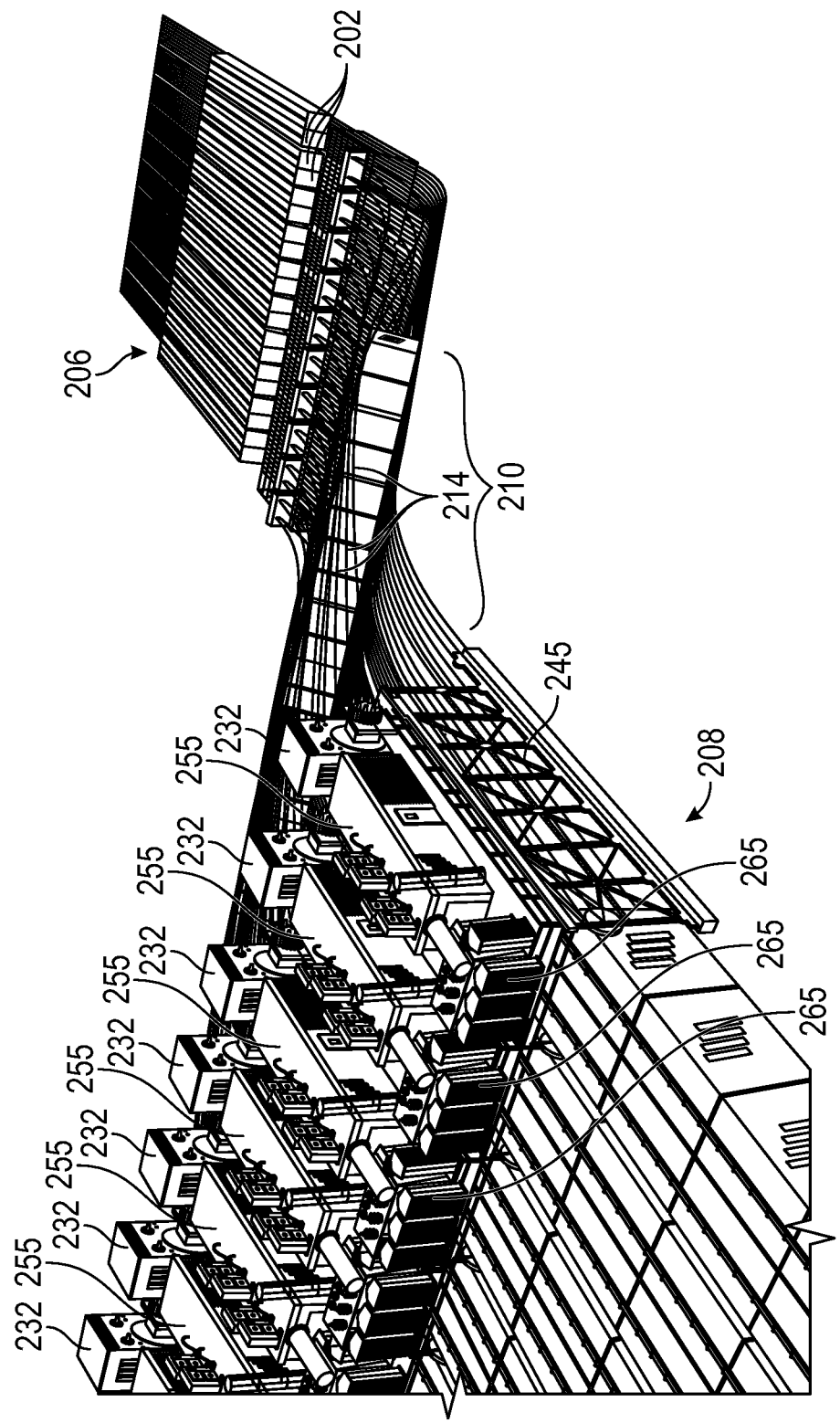
FIG. 22 illustrates an exemplary energy storage system comprising a plurality of tracks and power modules.

As shown in FIGS. 17-22 an energy storage system 200 is provided that comprises one or more mass cars 202 that are configured to move along at least one track 204 to and from a lower storage yard 206 (e.g., a discharged area as described above) and an upper storage yard 208 (e.g., a charged area). As in other embodiments, the lower storage yard 206 and upper storage yard 208 are separated by an inclined area 210 (e.g., a slope), and the slope, run, height, and angle of inclination can vary as described elsewhere herein. In addition, as in other embodiments, the number of tracks and the number and size of mass cars can vary. For example, FIG. 17 illustrates a single mass car 202 at an upper storage yard 206, while FIG. 22 illustrates a plurality of mass cars 204 on a plurality of tracks 204 (e.g., 10 tracks). As in other embodiments, the energy storage system 200 is readily scalable, depending on the site size and energy storage requirements.

Figure 18:
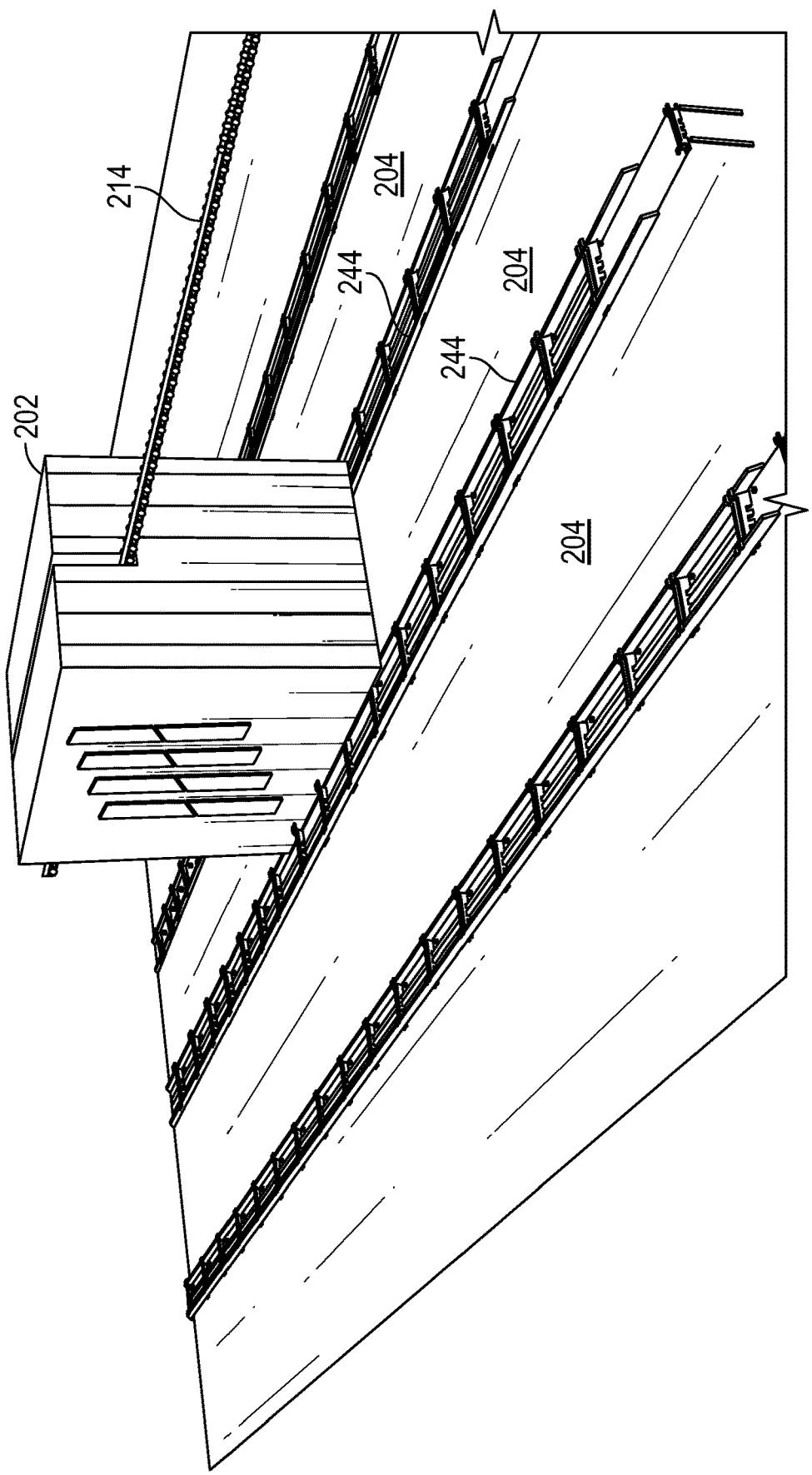
FIG. 18 illustrates a mass car of an energy storage system on a track.
Figure 19:
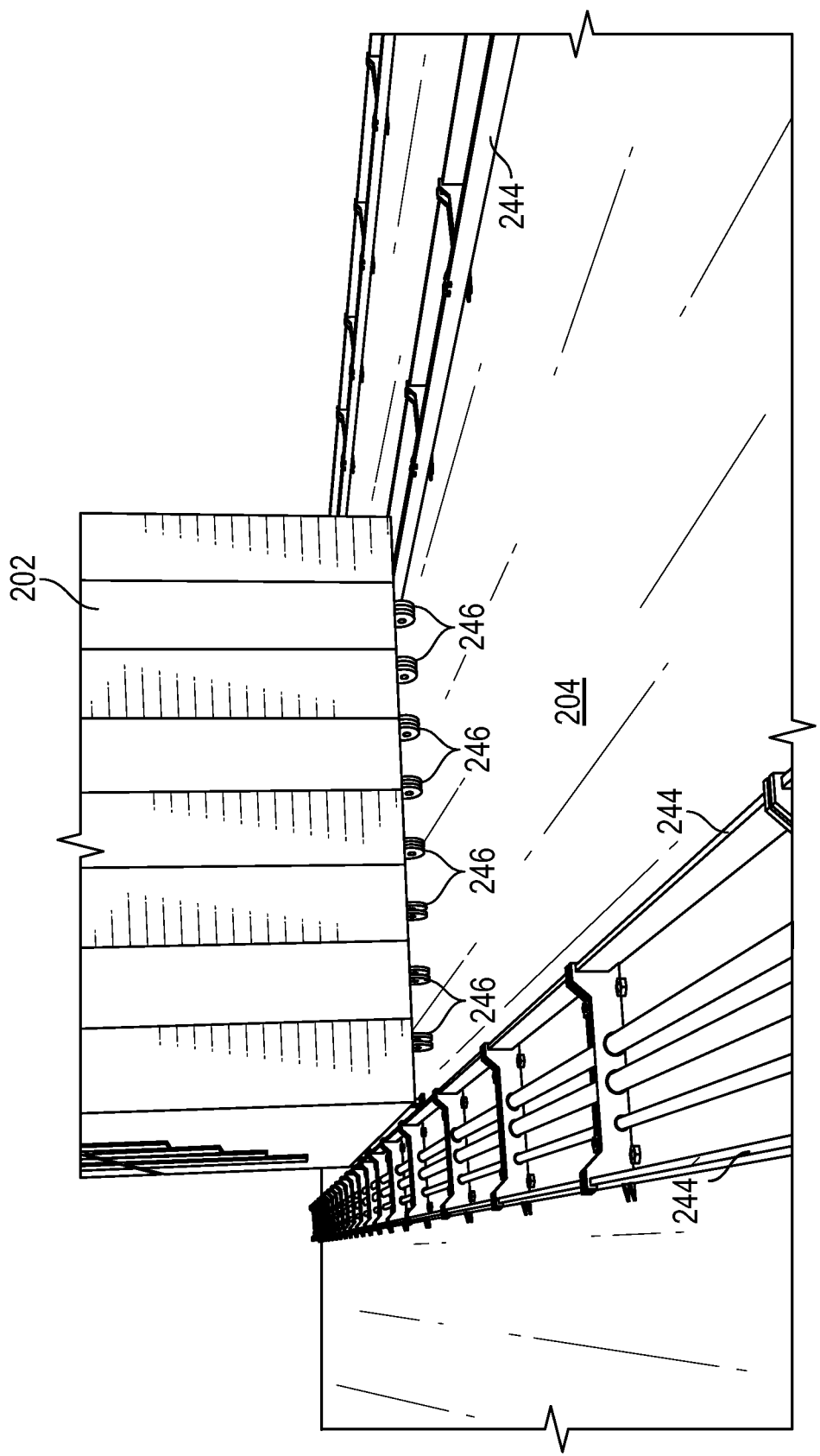
FIG. 19 illustrates another mass car of an energy storage system on a track.

As shown in FIG. 18, in this embodiment, each track defines a travel pathway between two rails 244. The two rails 244 restrict lateral movement away from and/or outside of the predetermined travel pathway by providing an enclosed pathway in which the mass cars 204 can move between the lower and upper storage yards 206, 208. As shown in FIGS. 18 and 19, one or more (e.g., three conduits) can be provided between the rails to provide power and/or communications to the system. A plurality of cross members can extend between the two rails 244 as shown in FIG. 19.

FIG. 17 illustrates an exemplary upper storage area 208 that includes motor/generators 232 that engage with one or more tethers (e.g., through respective sprocket 234) during charging and discharging. During charging, motor-generators 232 drive the respective sprockets using energy from the electrical grid to move one or more mass cars 202 up the inclined area 210 to the upper storage yard 208. During discharging, one or more mass cars 202 move down the inclined area 210 to the lower storage yard 206. The potential energy stored with the mass cars 202 at the upper storage yard 208 is converted back into electricity by regeneratively braking the movement of the mass cars 202. As in other embodiments, the motor-generators can convert the electricity into a form that suitable for the power grid and the dispatched energy can be routed by a control system to the power grid.

In addition to controlling the routing of energy into the power grid, the control system of the energy storage system can control the operation of the power modules and conveyance system, including the position of each mass car, and the speed, acceleration, and direction of transport (i.e., charging, discharging) of the mass cars.

A braking system 235 can be associated with each motor-generator 232. In some embodiments, as a safety measure, the braking system 235 can comprise a compressed air system that is engaged with the braking system and a loss of air pressure on the braking system causes the brakes to engage and restrict movement of the tethers of the conveyance system when emergency braking is required.

As shown in FIG. 17, equipment associated with the motor-generators 232 and related electrical energy storage and transfer can be raised on one or more support structures 245 to permit the tracks 204 to extend below the equipment. For example, as shown in FIG. 17, the motor-generators 232, one or more E-Houses 255, and one or more transformers 265 are provided above the tracks 204 on a supporting structure 245 and the mass cars 202 can be conveniently moved below the supporting structure 245 into the upper storage yard 208.

The E-House 255 can serve as a location to protect and house electrical equipment associated with the energy storage system. It can also provide a single point of location for ease of access and maintainability of the smaller electrical items integral to the function of system itself.

Referring to FIGS. 18-20, exemplary mass cars 202 are illustrated in more detail. As discussed above, the weight, size, and construction of the mass cars can vary based on site requirements. As noted above, in some embodiments, a mass car can weigh between 2 and 350 tons, or between 0 and 2 tons or between 351 and 500 tons depending on the application and energy requirements. For example, in some specific embodiments, each mass car can be 250,000 lbs or greater, 400,000 lbs or greater, 500,000 lbs or greater, 600 lbs or greater, or 700,000 lbs or greater. In some embodiments, the mass cars can be 1,000,000 lbs or less (e.g., 500,000 lbs≤mass car weight≤1,000,000 lbs).

Because of the large mass of each mass car, preferably high-density and low-cost materials are used for the mass. For example, in some embodiments, the mass car can comprise concrete, iron ore, local aggregate fill, and/or any combinations thereof. The dimensions of the mass car are a function of the material density and the selected fill.

In some embodiment, the mass car can provide a bulk density between 200 lb/ft$^3$ and 500 lb/ft$^3$, or between 300 lb/ft$^3$ and 400 lb/ft$^3$, such as 321 lb/ft$^3$ based on a mass car of approximately 10 feet (width)×19 feet (length) and 13 feet (height) (e.g., 2470 ft$^3$) to provide 793,000 lbs.

The number of wheels per mass car can vary. In some embodiments, multiple rows of wheels can be provided. For example, in one embodiment, each mass car includes four rows of eight wheels 246, for 32 wheels in total. The number of can vary depending on mass car size and load, and the pathway traveled by the mass cars. In the embodiment shown in FIG. 20, the tether maintains the general path of travel of the mass cars. To further restrict lateral movement and/or maintain the desired track pathway, one or more guide members 275 can be provided along a bottom and/or side surface of the mass car. Guide members can engage with the rail system, either continuously or intermittently when a car mass begins to move laterally, to restrict lateral movement out of the desired path of travel.

In some embodiments, one or more additional aids can be provided to facilitate and/or reduce stresses when traveling over the crest of the hill. For example, mass cars can further include one or more "bogeys" of the type utilized in railway and/or marine applications.

Referring to FIG. 21, as described elsewhere herein, the tether(s) provides for the conveyance of the mass cars between the upper and lower storage yards. The tether 214 can comprise a chain system that tows the mass cars up the production slope during charging and is pulled by the mass cars during discharging. The chain can comprise a heavy duty chain and sprocket system. The chain can engage with a coupling member of the mass cars in various ways to provide for towing and pulling in the different charging/discharging states. For example, in the prior embodiments, a plurality of tethers engage with coupling members on the sides of the mass car. In other embodiments, as shown in FIG. 18, one or more tethers can engage with a coupling member of the mass car(s) at a location between the two sides. For example, in FIG. 18, the chain 214 extends through a central area of the mass car and engages with a respective linear gear system (e.g., a rack member) that extends along all or part of the area of the central length of the mass car to engage with the chain so that the chain can tow the mass cars in a manner similar to a rack and pinion system. Any suitable coupling member can be utilized, so long as the coupling member is capable of removably engaging with the chain to permit towing and release of the mass car in the manners described herein.

Although shown as a single tether in engagement with the mass car, it should be understood that any number of tethers can be provided and can engage with the mass cars in a central location on the top surface, on a side of the top surface, and/or along one or more side surfaces of the mass car. In addition, as noted above, the tethers can be endless tethers that form a closed loop of material to drive the mass cars along the tracks of the conveyance system.

FIG. 22 illustrates an energy store system that includes a plurality of tracks 204 carrying mass cars 202. As discussed above, a plurality of motor-generators 232 are provided with respective tracks 204 to drive respective tethers 214. In some embodiments, each power module 131 can comprise between two and twenty high-efficiency motor-generators, or, in other embodiments, one high-efficiency motor-generator, or between twenty-one and fifty high-efficiency motor-generators. Power modules 131 can be coupled to a substation 140 by so that the substation 140 can deliver energy used by the power modules 131 (during charging) and receive energy dispatched by the power modules 131 (during discharging).

As described above, the track systems disclosed herein can comprise any surface and/or path along which the mass cars travel between the lower and upper storage yards. In some embodiments, the track comprises rails upon which wheels move and in other embodiments the track system can use rails that provide a change in surface elevation to optionally bound the defined pathway of the track. It should be understood that the "rails" that define the pathway can comprise any linear structure that provides a raised edge extending along the path. Thus, for example, the path could be defined by an edge of a recessed region.

Figure 23:
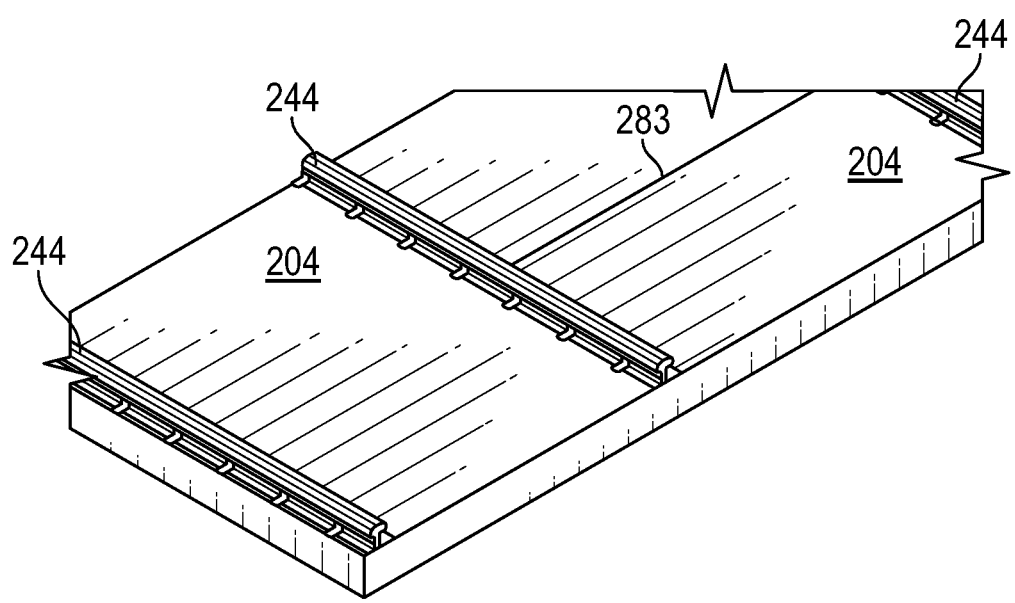
FIG. 23 illustrates an exemplary track surface for an energy storage system.

FIG. 23 illustrates an embodiment in which the mass cars travel along a firm surface, bound by a plurality of rails. For example, the track surface can comprise a steel surface (e.g., a plurality of steel plates extending along the track) along which the wheels of the mass car move. One or more perpendicular stability plates 281 can be provided to aid in slope stability.

Figure 24:
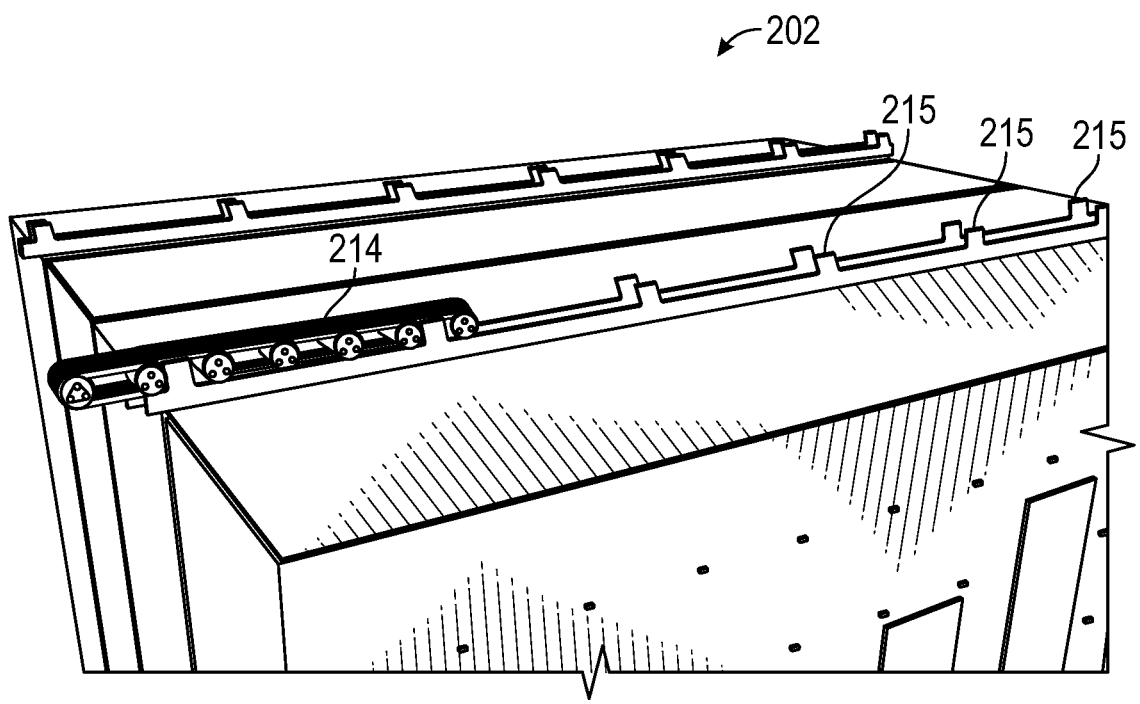
FIG. 24 illustrates an exemplary interface between a tether and a mass car.

The coupling member of the conveyance system which provides the interface between the tether 214 and mass car can be achieved in a variety of manners. For example, in FIG. 24, the tether 214 can engage with extending structures 215 that extend from a surface of the mass car (e.g., such as a top surface). In this embodiment, for example, a chain can include a plurality of links that extend laterally to engage with a raised structure that extends from the mass car 202.

Figure 25:
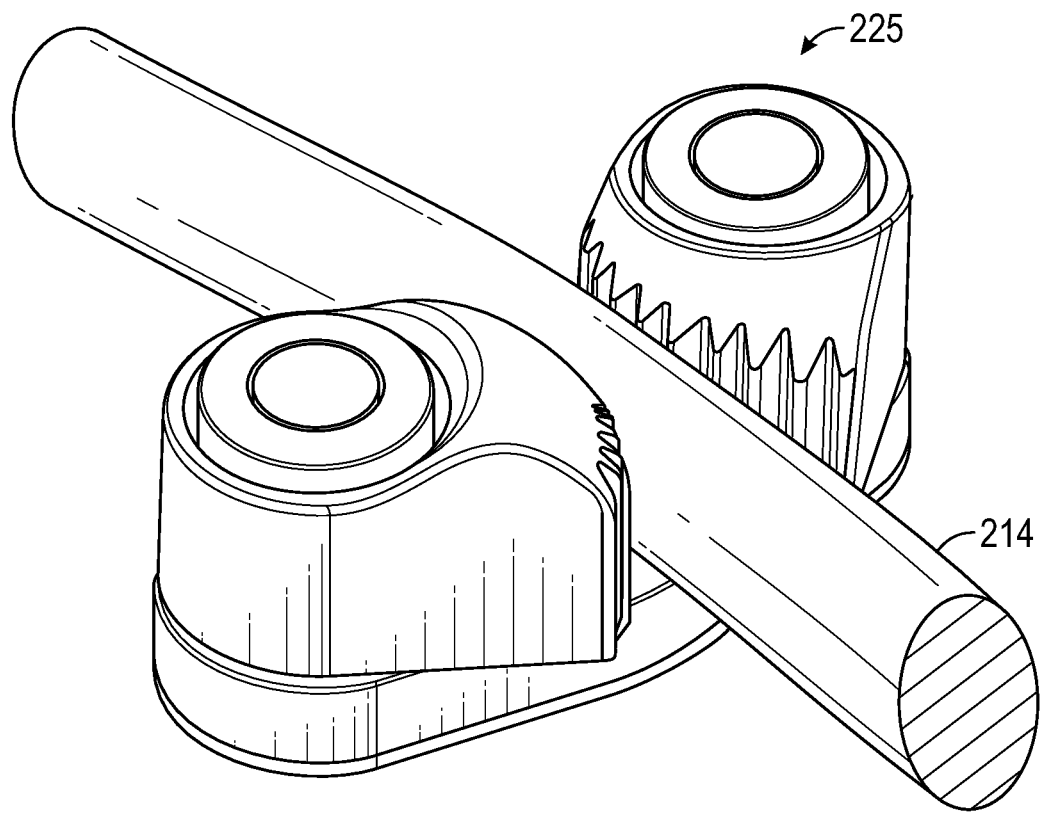
FIG. 25 illustrates another exemplary interface between a tether and a mass car.

As described in other embodiments, the coupling member can permit the mass car to be at least temporarily secured to the tether in at least one direction. As another example of a coupling member, FIG. 25 illustrates a cleat interface in which a chain or other tether structure 214 (e.g., a cable as shown in FIG. 25) can engage with the cleat interface 225 and the cleat interface exerts lateral pressure against the tether to capture the tether and restrict its movement relative to the cleat interface 225. In some embodiments, cleat interface 225 can restrict movement in one direction (e.g., a downhill direction) and allow movement in the other direction (e.g., an uphill direction) to release a mass car once it has reached the upper storage yard.

Figure 26:
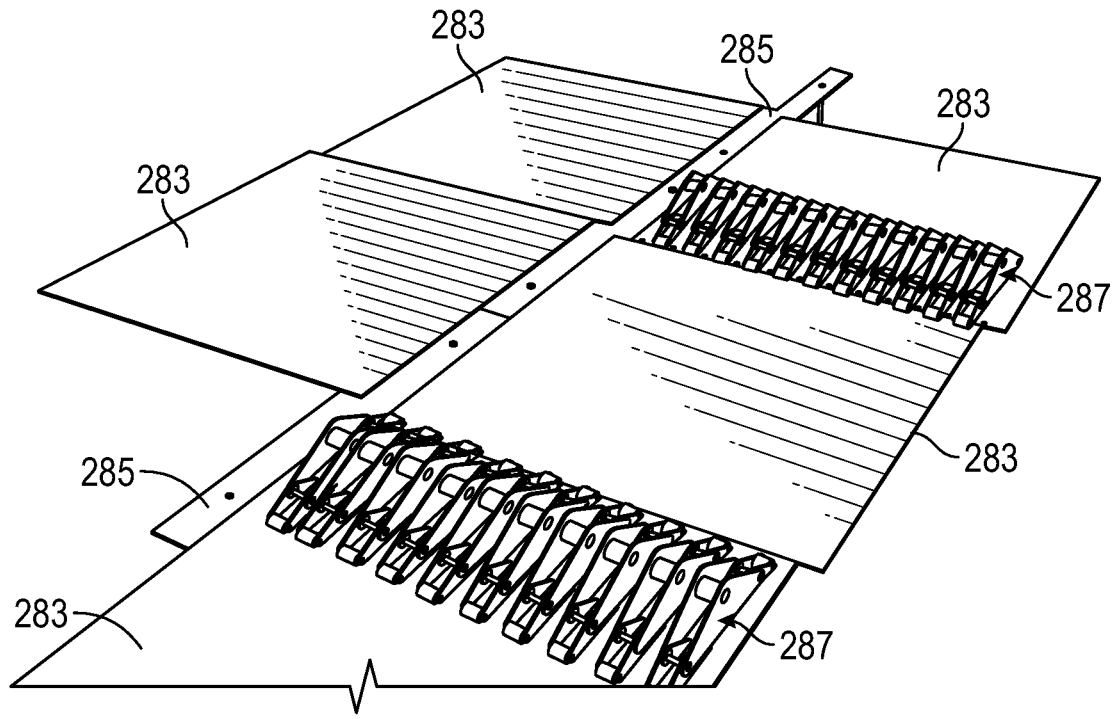
FIG. 26 illustrates a portion of a track formed from a plurality of plates.

FIG. 26 illustrates a plurality of plates 283, which can be formed from steel surface (e.g., a plurality of steel plates extending to define the track 204) along which the wheels of the mass car move. One or more plate connectors 285 can be provided to aid in slope stability and/or to link adjacent plates to one another. Plate connectors 285 can be anchored to the ground and, in some embodiments, rails 244 can be secured to the plate connectors 285 (e.g., bolted to the connectors).

Figure 27:
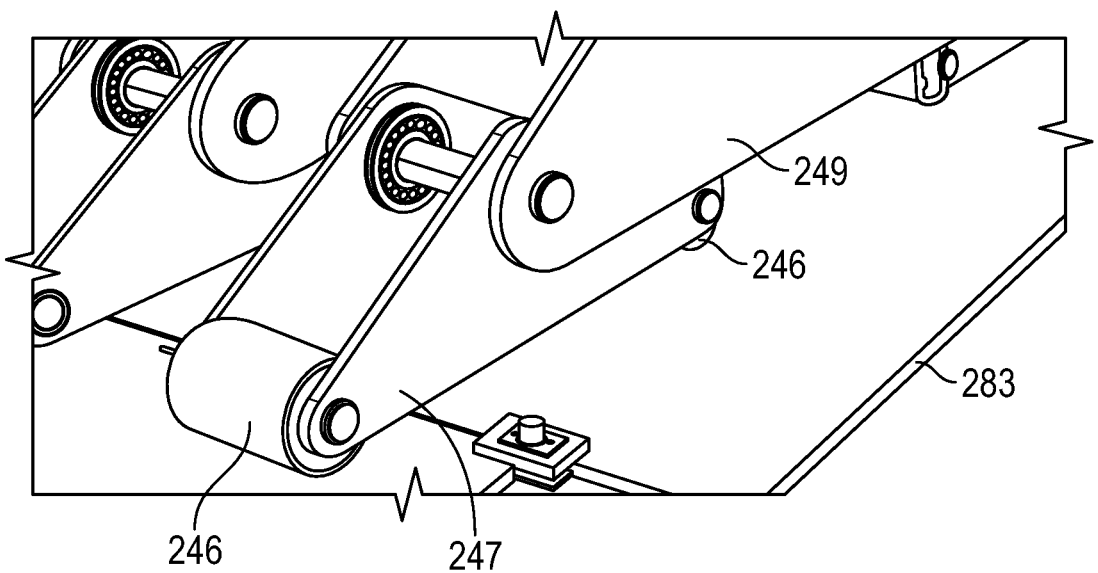
FIG. 27 illustrates an exemplary wheel configuration for a mass car.

FIG. 26 also illustrates a plurality of wheel suspension assemblies 287 of a mass car (shown without other portions of the mass car for clarity) on a track formed from a plurality of plates 285. As shown in FIG. 27, each wheel suspension assembly can comprise a pair of wheels 246 pivotably mounted on a frame 247 coupled to the wheel suspension frame 249 to allow for adjustments of the wheels as they move across the track.

Figure 28:
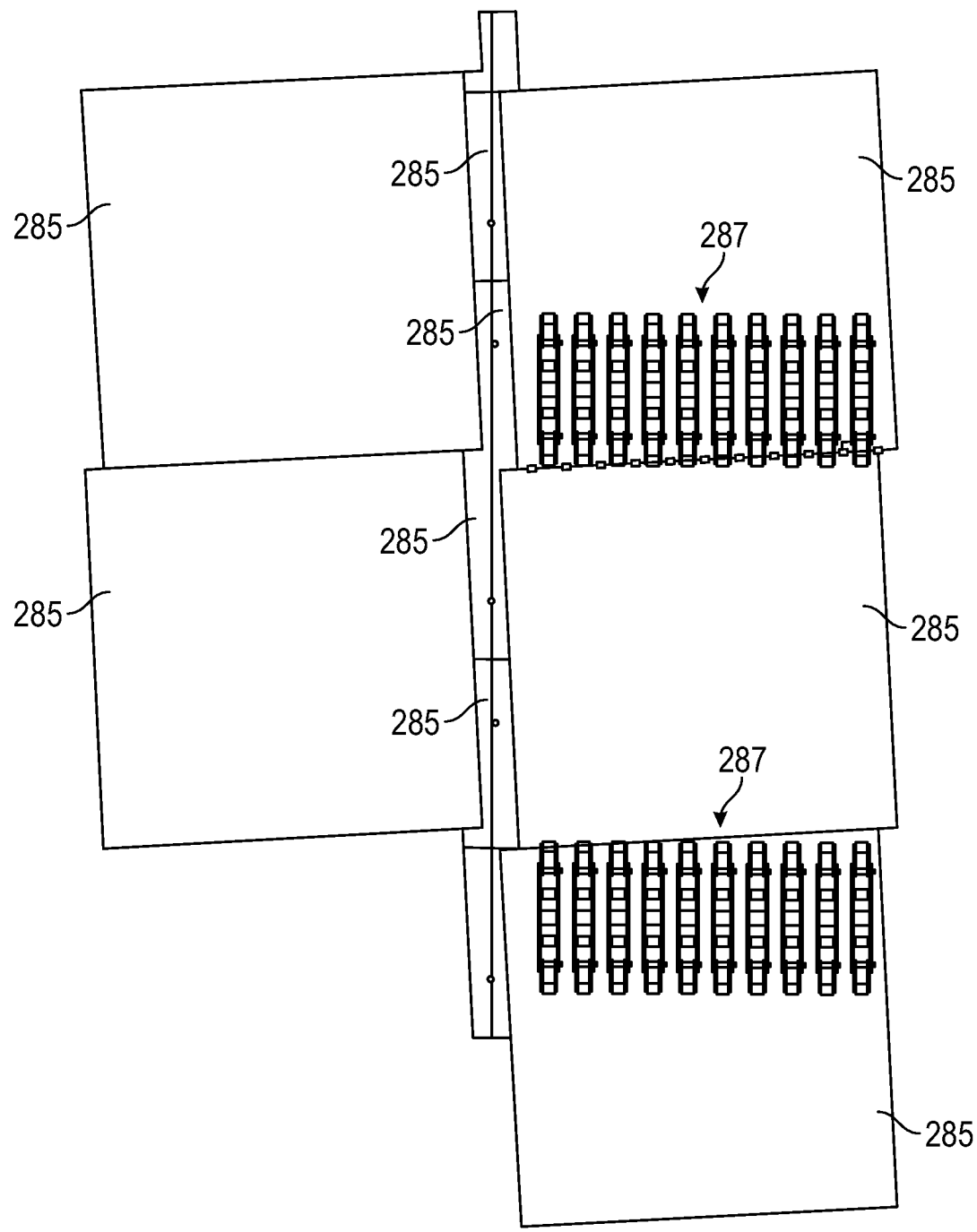
FIG. 28 illustrates a portion of a track formed from a plurality of plates.
Figure 29:
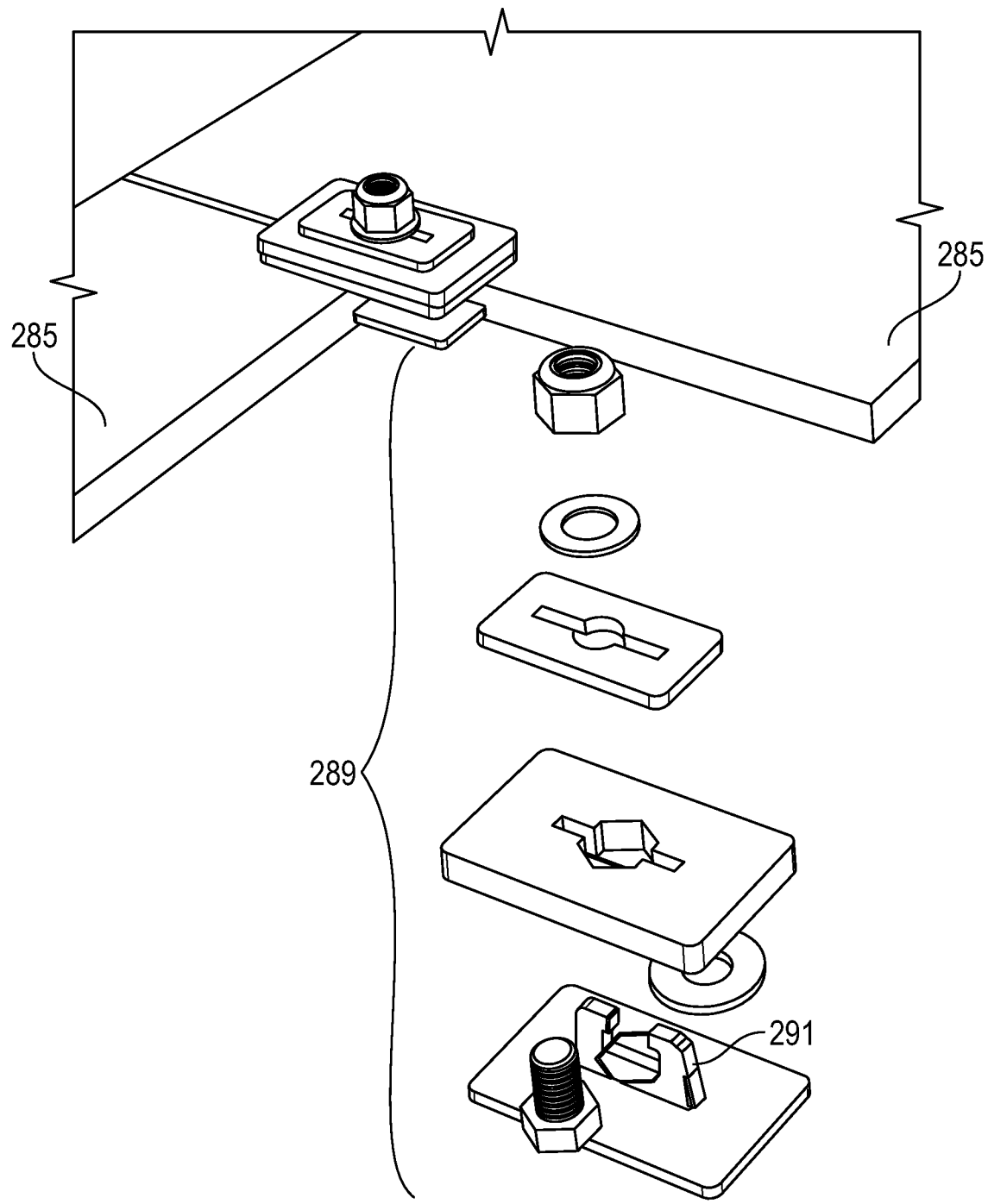
FIG. 29 illustrates an exemplary coupling and/or spacing system for use with adjacent plates.

FIG. 28 illustrates an exemplary plate 283 mounting arrangement in which a plurality of plates 285 are provided adjacent a plurality of stability plates 285. In some embodiments, as shown in FIG. 29, adjacent plates can be coupled to one another and a spaced apart form one other by a spacing system 289 to provide a secure system that permits expansion and contraction of the plates. For example, a spacing member 291 can extend between adjacent plates 285 and a one or more coupling members can secure the spacing member between adjacent plates as shown in FIG. 29.

Additional implementations of the systems and methods disclosed herein are provided in the following clauses:

Clause 1: An energy storage system comprising a track extending from a lower storage yard to an upper storage yard, the track having an inclined area between the lower storage yard and the upper storage yard; a plurality of mass cars moveable along the track, each of the plurality of mass cars comprising at least one coupling member; a conveyance system comprising at least one tether comprising a plurality of fixtures configured to engage with the at least one coupling member of a respective mass car; and a power module associated with the at least one tether comprising at least one motor-generator configured to drive a respective ones of the at least one tether to move the plurality of mass cars from the lower storage yard to the upper storage yard along the track, and to dispatch energy when the plurality of mass cars are moved from the upper storage yard to the lower storage yard along the track.

Clause 2: The energy storage system of clause 1, wherein the inclined area has a grade that ranges from 35% to 215%.

Clause 3: The energy storage system of clause 1, wherein the inclined area has a grade that ranges from 1% to 34%.

Clause 4: The energy storage system of clause 1, wherein the inclined area has a grade that ranges from 216% to 200,000%.

Clause 5: The energy storage system of any of the preceding clauses wherein the inclined area has a generally consistent grade.

Clause 6: The energy storage system of any one of the preceding clauses, wherein the coupling members of the plurality of mass cars comprise a rigid structure with a receiving portion and the plurality of fixtures on the at least one tether comprise a shaft that extends from one or more tether links of the at least one tether to releasably engage with a respective one of the receiving portions of the rigid structure.

Clause 7: The energy storage system of clause 6, wherein the receiving portion of the rigid structure comprises an opening that faces a downgrade direction.

Clause 8: The energy storage system of any one of clauses 6 or 7, wherein the rigid structure is positioned on an upper surface of a respective mass car.

Clause 9: The energy storage system of any one of clauses 1-5, wherein the coupling members of the plurality of mass cars comprise a rigid structure to which one or more tether links of the at least one tether releasably engage with.

Clause 10: The energy storage system of clause 9, wherein the coupling members of the plurality of mass cars comprise a linear gear.

Clause 11: The energy storage system of any of the preceding clauses wherein the conveyance system extends an entire length of the inclined area and includes a first end that at the lower storage yard and a second end at the upper storage yard.

Clause 12: The energy storage system of clause 11, wherein the first end of the conveyance system comprises a plurality of idler sprockets.

Clause 13: The energy storage system of any one of clauses 11 and 12, wherein the second end of the conveyance system comprises a plurality of driving sprockets that engage with an input shaft driven by the at least one motor-generator associated with the power module.

Clause 14: The energy storage system of any one of the preceding clauses, wherein the track comprises at least two rails that define a path of travel of the track.

Clause 15: The energy storage system of clause 14, wherein the mass cars comprise wheels that engage with the at least two rails.

Clause 16: The energy storage system of clause 14, wherein the mass cars comprise wheels that are positioned between the at least two rails.

Clause 17: The energy storage system of any one of the preceding clauses, wherein each of the mass cars comprises a plurality of rows of wheels.

Clause 18: The energy storage system of clause 15, wherein each of the wheels of the mass cars are double flanged track wheels.

Clause 19: The energy storage system of any one of the preceding clauses, wherein the conveyance system is configured to receive a single mass car at time.

Clause 20: The energy storage system of any one of the preceding clauses, wherein each of the plurality of mass cars are configured to weigh 2 tons to 350 tons.

Clause 21: The energy storage system of any one of clauses 1-19, wherein each of the plurality of mass cars are configured to weigh more than 0.25 ton and less than 2 tons.

Clause 22: The energy storage system of any one of clauses 1-19, wherein each of the plurality of mass cars are configured to weigh more than 350 tons and less than 500 tons.

Clause 23: The energy storage system of any one of the preceding clauses, wherein the at least one tether are aluminum chains.

Clause 24: The energy storage system of any one of the preceding clauses, wherein the at least one tethers are steel chains.

Clause 25: The energy storage system of any one of the preceding clauses, wherein the change in elevation from the lower storage yard to the upper storage yard is between 200 feet and 2,000 feet.

Clause 26: The energy storage system of any one of the preceding clauses, wherein the change in elevation from the lower storage yard to the upper storage yard is greater than 10 and but less than 200 feet.

Clause 27: The energy storage system of any one of the preceding clauses, wherein the change in elevation from the lower storage yard to the upper storage yard is more than 2,000 feet.

Clause 28: The energy storage system of any of the preceding clauses, wherein the upper storage yard comprises a support structure that extends over the tracks of the upper storage yard and supports the power module.

Clause 29: An energy storage system comprising a plurality of tracks extending from a lower storage yard to an upper storage yard, the plurality of tracks having an inclined area between the lower storage yard and the upper storage yard, the plurality of tracks including a first track; a plurality of mass cars moveable along the plurality of tracks, each of the plurality of mass cars comprising at least one coupling member; a plurality of conveyance systems each comprising at least a first tether, each of the first tethers comprising a plurality of fixtures configured to engage with the at least one coupling member of a respective mass car; and a plurality of power modules associated with the plurality of conveyance systems, each respective first tether being associated with a first power module, each of the first power modules comprising at least one motor-generator configured to drive a respective one of the first tethers to move the plurality of mass cars from the lower storage yard to the upper storage yard, and to dispatch energy when the plurality of mass cars are moved from the upper storage yard to the lower storage yard.

Clause 30: The energy storage system of clause 29, wherein the number of tracks ranges from two to twenty, from five to twenty, or from seven to twenty.

Clause 31: A method of storing energy comprising providing a track extending from a lower storage yard to an upper storage yard, the track having an inclined area between the lower storage yard and the upper storage yard; coupling a plurality of mass cars to a conveyance system comprising at least a first tether; driving a first power module associated with the first tether to drive the conveyance system and transport the plurality of mass cars along the inclined area from the lower storage yard to the upper storage yard to store energy; transporting the plurality of mass cars along the inclined area from the upper storage yard to the lower storage yard to dispatch energy with the first power modules; and transferring the energy dispatched by the first power modules to a power grid.

Clause 32: The method of clause 31, further comprising controlling the first power module and conveyance system by sending one or more signals that direct a position of each mass car, and a speed, acceleration, and direction of transport of the mass cars.

Clause 33: The method of any one of clauses 31 and 32, further comprising releasing the plurality of mass cars from the conveyance system after the mass car is moved to the upper storage yard and/or after the mass car is lowered to the lower storage yard.

Clause 34: The method of clause 33, wherein each of the mass cars comprises at least one coupling member that engages with a corresponding member of one or more tether links of the first tether, the coupling members and corresponding members being configured to be releasably engaged.

Clause 35: The method of any one of clauses 31-34, wherein inclined area has a grade that ranges from 35% to 215%, or from 1% to 34% or from 216% to 200,000%.

Clause 36: A method of storing energy comprising providing a plurality of tracks extending from a lower storage yard to an upper storage yard, each track having an inclined area between the lower storage yard and the upper storage yard; coupling a plurality of mass cars to a plurality of conveyance systems that each comprise at least a first tether; driving a plurality of power modules associated with the first tethers to drive the conveyance systems and transport the plurality of mass cars along the inclined area from the lower storage yard to the upper storage yard to store energy; transporting the plurality of mass cars along the inclined area from the upper storage yard to the lower storage yard to dispatch energy with the plurality power modules; and transferring the energy dispatched by the plurality power modules to a power grid.

Clause 37: The method of clause 36, wherein the number of tracks ranges from two to twenty, from five to twenty, or from seven to twenty.

Clause 38: The method of any one of clauses 36 and 37, wherein the first tethers comprise a metal chain.

Clause 39: The method of any one of clauses 36 and 37, wherein the first tethers comprise an aluminum and/or steel chain.

Clause 40: The method or system of any one of the preceding clauses, wherein the tethers (e.g., first tethers) are endless tethers.

Clause 41: The method or system of any one of the preceding clauses, wherein the tethers (e.g., first tethers) have a first end and a second end, and the second end is not coupled to the first end.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. An energy storage system comprising:
   a track extending from a lower storage yard to an upper storage yard, the track having an inclined area between the lower storage yard and the upper storage yard;
   a plurality of mass cars moveable along the track, each of the plurality of mass cars comprising at least one coupling member, the plurality of mass cars each comprising a first side, a second side, and an upper surface;
   a conveyance system comprising at least one tether comprising a plurality of fixtures configured to engage with the at least one coupling member of a respective mass car; and
   a power module associated with the at least one tether comprising at least one motor-generator configured to drive respective ones of the at least one tether to move the plurality of mass cars from the lower storage yard to the upper storage yard along the track, and to dispatch energy when the plurality of mass cars are moved from the upper storage yard to the lower storage yard along the track,
   wherein the at least one coupling member of respective ones of the plurality of mass cars comprises a rigid structure on or adjacent to the upper surface and between the first side and the second side of the mass car.

2. The energy storage system of claim 1, wherein the inclined area has a grade that ranges from 35% to 215%.

3. The energy storage system of claim 1, wherein the inclined area has a grade that ranges from 1% to 34%.

4. The energy storage system of claim 1, wherein the inclined area has a grade that ranges from 216% to 200,000%.

5. The energy storage system of claim 1, wherein the inclined area has a generally consistent grade.

6. The energy storage system of claim 1, wherein the rigid structure has a receiving portion and the plurality of fixtures on the at least one tether comprise a shaft that extends from one or more tether links of the at least one tether to releasably engage with a respective one of the receiving portions of the rigid structure.

7. The energy storage system of claim 6, wherein the receiving portion of the rigid structure comprises an opening that faces a downgrade direction.

8. The energy storage system of claim 6, wherein the rigid structure is positioned at a recessed portion of the upper surface of the mass car.

9. The energy storage system of claim 1, wherein the coupling members of the plurality of mass cars comprise a rigid structure to which one or more tether links of the at least one tether releasably engage with.

10. The energy storage system of claim 9, wherein the coupling members of the plurality of mass cars comprise a linear gear.

11. The energy storage system of claim 1, wherein the conveyance system extends an entire length of the inclined area and includes a first end that at the lower storage yard and a second end at the upper storage yard.

12. The energy storage system of claim 11, wherein the first end of the conveyance system comprises a plurality of idler sprockets.

13. The energy storage system of claim 11, wherein the second end of the conveyance system comprises a plurality of driving sprockets that engage with an input shaft driven by the at least one motor-generator associated with the power module.

14. The energy storage system of claim 1, wherein the track comprises at least two rails that define a path of travel of the track.

15. The energy storage system of claim 14, wherein the mass cars comprise wheels that engage with the at least two rails.

16. The energy storage system of claim 14, wherein the mass cars comprise wheels that are positioned between the at least two rails.

17. The energy storage system of claim 1, wherein each of the mass cars comprises a plurality of rows of wheels.

18. The energy storage system of claim 15, wherein each of the wheels of the mass cars are double flanged track wheels.

19. The energy storage system of claim 1, wherein the conveyance system is configured to receive a single mass car at time.

20. The energy storage system of claim 1, wherein each of the plurality of mass cars are configured to weigh 2 tons to 350 tons.

21. An energy storage system comprising:
a track extending from a lower storage yard to an upper storage yard, the track having an inclined area between the lower storage yard and the upper storage yard;
a plurality of mass cars moveable along the track, each of the plurality of mass cars comprising at least one coupling member;
a conveyance system comprising at least one tether comprising a plurality of fixtures configured to engage with the at least one coupling member of a respective mass car; and
a power module associated with the at least one tether comprising at least one motor-generator configured to drive a respective ones of the at least one tether to move the plurality of mass cars from the lower storage yard to the upper storage yard along the track, and to dispatch energy when the plurality of mass cars are moved from the upper storage yard to the lower storage yard along the track,
wherein the power module is elevated above the track by one or more support structures.

22. An energy storage system comprising:
a plurality of tracks extending from a lower storage yard to an upper storage yard, the plurality of tracks having an inclined area between the lower storage yard and the upper storage yard;
a plurality of mass cars moveable along respective ones of the plurality of tracks, each of the plurality of mass cars comprising at least one coupling member;
a conveyance system comprising a plurality of tethers, each tether comprising a plurality of fixtures configured to engage with the at least one coupling member of a respective mass car; and
a plurality of power modules associated with respective ones of plurality of tethers, each power module comprising at least one motor-generator configured to drive respective tethers to move respective mass cars from the lower storage yard to the upper storage yard along respective tracks, and to dispatch energy when the respective mass cars are moved from the upper storage yard to the lower storage yard along the respective track,
wherein the power modules are elevated above the plurality of tracks by one or more support structures.

* * * * *